United States Patent [19]

Oliver et al.

[11] Patent Number: 5,164,928

[45] Date of Patent: Nov. 17, 1992

[54] ERROR RECOVERY IN A CARTRIDGE HANDLING SYSTEM

[75] Inventors: Thomas C. Oliver; Mark J. Bianchi, both of Ft. Collins; Rick A. Kato, Greeley; Kraig A. Proehl, Loveland, all of Colo.

[73] Assignee: Hewlett-Packard Company, Palo Alto, Calif.

[21] Appl. No.: 838,377

[22] Filed: Feb. 19, 1992

Related U.S. Application Data

[63] Continuation of Ser. No. 443,773, Nov. 30, 1989, abandoned.

[51] Int. Cl.[5] .................... G11B 17/22; G11B 15/68
[52] U.S. Cl. ........................................ 369/34; 360/92
[58] Field of Search .................. 369/178, 33, 34, 35, 369/36, 38, 39; 360/92, 69, 71

[56] References Cited

U.S. PATENT DOCUMENTS

| | | | |
|---|---|---|---|
| 3,801,963 | 4/1974 | Chen | 360/5 |
| 4,068,156 | 1/1978 | Johnson et al. | 318/575 |
| 4,132,937 | 1/1979 | Engelberger et al. | 318/568 |
| 4,362,978 | 12/1982 | Pollard et al. | 318/568 |
| 4,621,331 | 11/1986 | Iwata | 364/513 |
| 4,701,902 | 10/1987 | Aoyagi et al. | 369/77.1 |
| 4,712,183 | 12/1987 | Shiroshita | 364/513 |
| 4,718,078 | 1/1988 | Bleidorn et al. | 318/568 |
| 4,766,581 | 8/1988 | Korn et al. | 369/30 |
| 4,774,445 | 9/1988 | Penkar | 318/568 |
| 4,782,473 | 11/1988 | Masaki | 369/34 |
| 4,807,153 | 2/1989 | Onaga et al. | 364/513 |
| 4,826,392 | 5/1989 | Hayati | 414/430 |
| 4,841,505 | 6/1989 | Aoyagi | 369/44.11 |
| 4,864,438 | 9/1989 | Munro | 360/92 |
| 4,908,559 | 3/1990 | Kurakaue et al. | 318/568.22 |
| 5,040,159 | 8/1991 | Oliver et al. | 369/178 |

Primary Examiner—John W. Shepperd
Assistant Examiner—Tan Nguyen

[57] ABSTRACT

Disclosed is an optical disk handling system, called an autochanger, having two control systems to provide the six motions necessary to move optical disk cartridges from storage holding cells to an optical drive. Whenever the mechanisms are being moved, the control systems monitor the progress of the movement, and should the control system detect an error conditon, a state update flag is changed to prevent further updates of the state of the system. With state updates disabled, the control system will stop all mechanisms and prevent further movement of the mechanisms. When the operation appears complete, an error recovery software function is called. When the error recovery software detects that the state update flag is in an error condition, error recovery is initiated. After the mechanism's state has been established, error recovery movement is started, based on the operation that was being performed at the time of the error, and the state of the machine at the time of the error. The type operation being performed is saved in non-volatile memory, so that the type of operation will be saved should electrical power fail during the operation. Therefore, after power is restored, power fail error recovery can perform error recovery based on the type of operation being attempted at the time power was lost.

11 Claims, 21 Drawing Sheets

ERROR RECOVERY IN A CARTRIDGE HANDLING SYSTEM

CROSS REFERENCED TO RELATED APPLICATIONS

This application is a continuation of application Ser. No. 07/443,773, filed Nov. 30, 1989, of Oliver, Bianchi, Kato, and Proehl, entitled "Error Recovery in a Cartridge Handling System", now abandoned.

BACKGROUND OF THE INVENTION

This invention relates to computer systems and more particularly to an apparatus for handling and storing optical disk cartridges. Even more particularly this invention relates to Error Recovery within such apparatus.

An optical disk is a data storage medium which is readable by a laser-based reading device. Optical disks known as "compact disks" or "CDs" have become increasingly popular during the past few years for recording music and audio-visual works. Due to the huge storage capacity of optical disks as compared to conventional magnetic storage media, optical disks known as "ROM disks" have become popular for storing computer readable information. Recent technology has produced optical disks which can be written as well as read by the computer, thus, in the future optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are generally mounted in cartridges, and the reading devices generally read or write data through a slot provided on a surface of the cartridge. Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk reader. In a disk storage system wherein the stored disks and an associated disk reader are arranged in a longitudinally extending, two-dimensional array consisting of vertically extending columns and laterally extending rows, it is necessary for a disk handling system to be capable of engaging a disk, moving it vertically, laterally, and longitudinally and then releasing it in order to remove it from storage, move it into aligned relationship with the disk reader, and insert it into the disk reader. It may further be necessary for the disk handling system to flip the disk to reverse the side thereof which will be positioned in readable relationship with a reader. It may also be necessary to reorient a disk at the time it is initially inserted into the system by an operator.

Any system involving mechanical movement is subject to variations of such movement, and therefore subject to errors in the movement, called physical errors. These variations are caused by friction variations from mechanism to mechanism, lubrication variations, electrical power fluctuations, and many other causes. Most of the errors are of a temporary nature, and can be corrected by repeating the movement, or re-calibration and then repeating the movement, or by counter movements that reverse an undesirable condition.

Another type of error condition that can arise in such a system is a logical error. A logical error occurs when the state of the device is different from the state known to the host computer system using the device. For example, a cartridge is located in a magazine, or slot, different from the location identified in the host computer system. Another example would be an empty slot that is identified by the host system as having a cartridge.

Prior art devices have generally attempted to recover errors by re-initializing the mechanisms of the device to a known state, then attempting the failed operation a second or subsequent times. Sometimes this is unsuccessful because the failed operation was partially completed, and cannot be performed in the same way again. This problem is exacerbated when the failure is due to a loss of electrical power, since the contents of the device memory is lost, causing the machine to lose track of the operation that was being performed.

There is need in the art then for a system that detects and corrects temporary physical errors. There is a further need in the art for such a system that corrects certain logical errors. Still another need is for such a device that uses knowledge of the failed operation to direct error recovery. Yet another need is for such a device to retain, through an electrical power removal and restoration cycle, a record of the last operation attempted.

Various features and components of such a cartridge handling system are disclosed in U.S. patent applications:

(A) Ser. No. 278,102 filed Nov. 30, 1988 for OPTICAL DISK HANDLING APPARATUS WITH FLIP LATCH of Methlie, Oliver, Stavely and Wanger; now U.S. Pat. No. 4,998,232.

(B) Ser. No. 288,608 filed Dec. 22, 1988 for OPTICAL DISK INSERTION APPARATUS of Christie, Wanger, Dauner, Jones and Domel; now U.S. Pat. No. 5,062,093.

(C) Ser. No. 289,388 filed Jan. 18, 1989 for LATERAL DISPLACEMENT CONTROL ASSEMBLY FOR AN OPTICAL DISK HANDLING SYSTEM of Wanger, Methlie, Stavely and Oliver; and (D) Ser. No. 305,898 filed Feb. 2, 1989 for OPTICAL DISK CARTRIDGE HANDLING APPARATUS WITH PASSIVE CARTRIDGE ENGAGEMENT ASSEMBLY of Wanger, Methlie, Jones and Stavely; now U.S. Pat. No. 5,014,255.

(E) Ser. No. 326,572 filed Feb. 28, 1989 for CARTRIDGE HANDLING SYSTEM of Wanger, Methlie, Christie, Dauner, Jones, Oliver, and Stavely, now U.S. Pat. No. 5,043,862.

(F) Ser. No. 326,146 filed Mar. 19, 1989 for MECHANICAL SENSE OF TOUCH IN A CONTROL SYSTEM of Oliver, Wanger, Stavely, Methlie, Bianchi, Kato, and Proehl, now U.S. Pat. No. 5,040,159.

(G) Ser. No. 334,665 filed Apr. 6, 1989 for CALIBRATION OF A CARTRIDGE HANDLING DEVICE USING MECHANICAL SENSE OF TOUCH of Oliver, Bianchi, Wanger, Stavely, and Proehl, (H) Serial No. 07/422,313 filed Oct. 16, 1989 for INPUT/OUTPUT COMMUNICATION BETWEEN AUTOCHANGER AND DRIVE of Wanger, Bianchi, and Proehl, which are each hereby specifically incorporated by reference for all that is disclosed therein.

SUMMARY OF THE INVENTION

It is an object of the present invention to detect and correct temporary physical errors in the movement of the mechanical components of a cartridge handling system.

It is another object of the invention to correct logical errors within the device when possible.

Another object of the invention to separate the error correction function from the movement functions.

Another object of the invention to allow a movement to complete High level or foreground program execution, even when an error occurs.

Another object of the invention to stop all physical movement, after an error, while allowing high level or foreground program execution to complete.

Still another object is to perform different error recovery operations based upon the state of the device at the time of the failure.

Another object of the invention is to use mechanical sense of touch in the device to collect information about the state of the device at the time of the failure.

A further object of the invention is to save an indication of the particular movement being performed when electrical power is removed from the device so that, upon restoration of electrical power, error recovery can be performed using the last movement that was attempted.

The above and other objects of the present invention are accomplished in an optical disk cartridge handling system, called an autochanger, having two control systems to provide the six motions necessary to move optical disk cartridges from storage holding cells to an optical drive. The system uses shaft encoders on two motors of the two control systems, and current or voltage feedback from the motors, for positioning, and for detecting the location of the mechanisms during mechanism moves, and at the end of such moves. A human operator can enter a cartridge into the system through a mail slot, which is rotatable to properly receive or eject cartridges. The control systems use a flip assembly in the autochanger to turn the cartridge over, allowing either side of the disk to be arranged for reading or writing by the optical drive. The control systems use a lateral displacement assembly to move a cartridge from a cell in one of the two columns of the autochanger to a cell in the other column, or to move a cartridge between the optical drive, which is located in one of the columns, to a cell in the other column. The control systems use a cartridge engaging assembly to attach to an exposed end portion of a cartridge positioned in a cell or the optical drive. A longitudinal displacement assembly is used by the control systems to move the cartridge, after attachment, out of the cell or optical drive. After positioning the cartridge vertically and laterally, the longitudinal displacement assembly is then used to move the cartridge into a cell or the optical drive, where the engaging assembly releases the cartridge.

Whenever the mechanisms are being moved, the control systems monitor the progress of the movement, and should the control systems detect an error condition, a state update flag is changed to prevent further updates of the state of the system. With state updates disabled, the control systems will stop all mechanisms and prevent further movement of the mechanisms. The software that calls the control systems, however, is unaware of this change in the state update flag, and continues to process until the operation appears complete. When the operation appears complete, the error recovery software function is called, and it detects the change in the state update flag.

When the error recovery software detects that the state update flag is in an error condition, error recovery is initiated. The type of error recovery performed is based on the state of the machine at the time the error condition was first detected, since this state has been saved by changing the state update flag. The first part of error recovery attempts to put the mechanisms into a known condition, based on the mechanism's positions at the time of the error. After the mechanism's condition has been established, error recovery movement is started, using the operation that was being performed at the time of the error, and the state of the machine at the time of the error.

The type operation being performed is always saved in non-volatile memory, so that the type of operation will be saved should electrical power fail during the operation. Therefore, after power is restored, power fail error recovery can perform error recovery using the type of operation being attempted at the time power was lost.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

Figure 1:
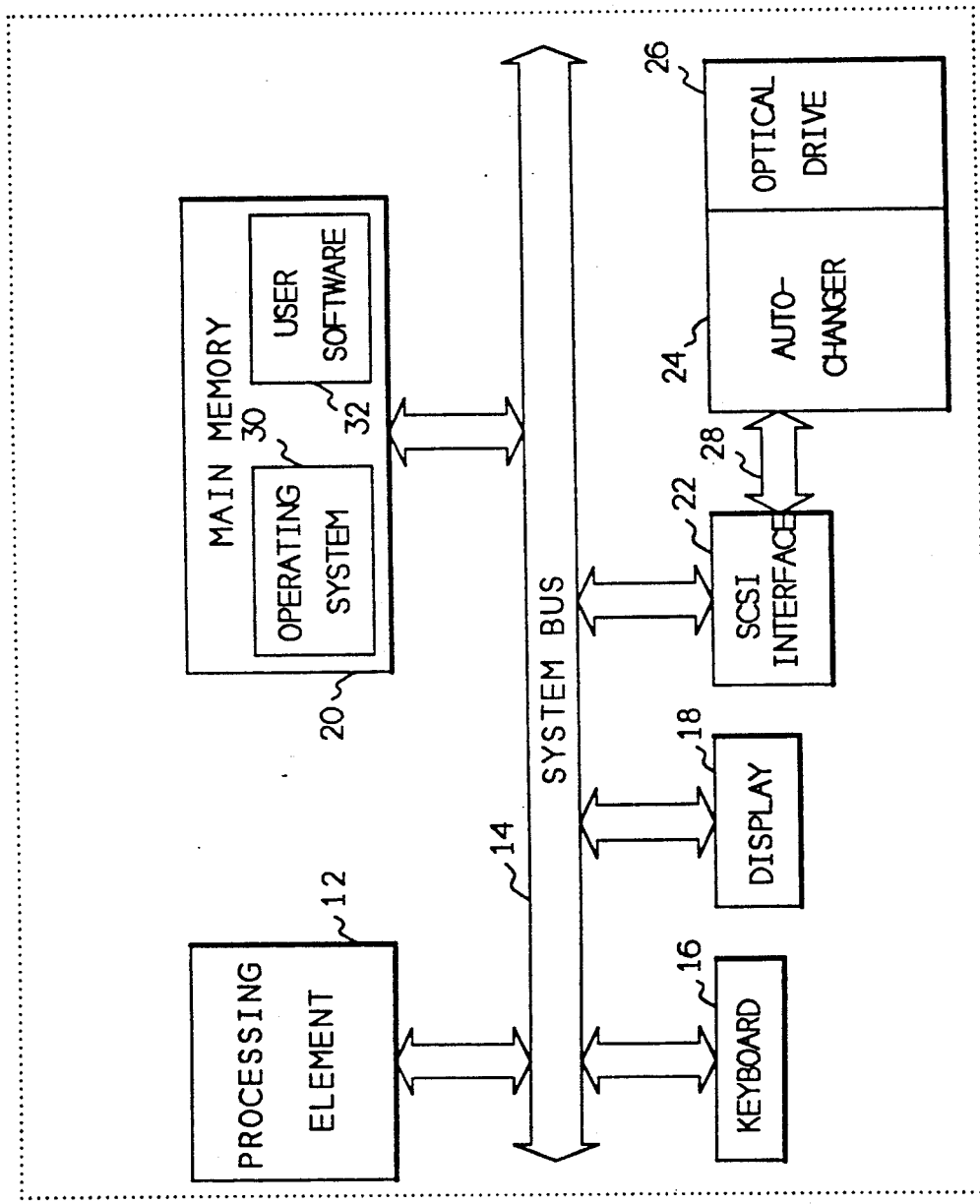
FIG. 1 shows a block diagram of a computer system incorporating the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

The optical disk handling system ("autochanger") of the present invention uses two control systems to provide the six motions necessary to move optical disk cartridges from a storage holding unit array ("cells") to an optical disk reading device ("optical drive"). The optical drive, also located in the array, reads or writes data on an optical disk in the cartridge. After the reading or writing operation, the cartridge is replaced in its original cell. A human operator can enter a cartridge into the system through a cartridge insertion assembly ("mail slot"). Each time an operator enters a cartridge into the mail slot, the control systems move the cartridge either to a cell or the optical drive as requested by the host computer system connected to the autochanger. Cartridges can also be moved from the optical drive or cells to the mail slot for removal by the operator.

Data can be located on either side of the optical disk within a cartridge. The control systems use a flip assembly in the autochanger to turn the cartridge over, allowing either side of the disk to be arranged for reading or writing by the optical drive.

The cells are organized into two columns. The control systems use a lateral displacement assembly to move a cartridge from a cell in one column to a cell in the other column, or to move a cartridge between the optical drive, which is located in one of the columns, to a cell in the other column. Also, the mail slot is located in one of the columns, so the control systems use the lateral displacement assembly to move a cartridge from the mail slot to the other column.

The control systems use a cartridge engaging assembly to attach to an exposed end portion of a cartridge positioned in a cell or the optical drive. A longitudinal displacement assembly is used by the control systems to move the cartridge, after attachment, out of the cell or optical drive. After positioning the cartridge vertically and laterally, the longitudinal displacement assembly is then used to move the cartridge into a cell or the optical drive, where the engaging assembly releases the cartridge. Together the cartridge engaging assembly, the longitudinal displacement assembly, and the lateral displacement assembly form an assembly called the transport.

A more complete description of the mechanical aspects of the autochanger may be had by referencing the aforementioned patent application (E).

Whenever the mechanisms are being moved, the control systems monitor the progress of the movement, and should the control systems detect an error condition, a state update flag is changed to prevent further updates of the state of the system. With state updates disabled, the control systems will stop all mechanisms and prevent further movement of the mechanisms. The software that calls the control systems, however, is unaware of this change in the state update flag, and continues to process until the operation appears complete. When the operation appears complete, the error recovery software function is called, and it detects the change in the state update flag.

When the error recovery software detects that the state update flag is in an error condition, error recovery is initiated. The type of error recovery performed is based on the state of the machine at the time the error condition was first detected, since this state has been saved by changing the state update flag. The first part of error recovery attempts to put the mechanisms into a known condition, based on the mechanism's positions at the time of the error. After the mechanism's condition has been established, error recovery movement is started, using the operation that was being performed at the time of the error, and the state of the machine at the time of the error.

The type of operation being performed is always saved in non-volatile memory, so that the type of operation will be saved should electrical power fail during the operation. Therefore, after power is restored, power fail error recovery can perform error recovery based on the type of operation being attempted at the time power was lost.

Referring now to FIG. 1, a block diagram of the environment of the present invention is shown. A computer system 10 has a processing element 12 connected to a system bus 14. The processing element 12 receives instructions from a main memory 20 via the system bus 14 and communicates with a human operator using a keyboard 16 for input and a display 18 for output. An interface 22, which may be a Small Computer System Interface (SCSI), connects the autochanger 24, via a bus 28, with the computer system 10. The autochanger 24 contains an array of cells for holding a plurality of optical disk cartridges. Each cartridge contains an optical disk which is used for data storage. Incorporated within the autochanger 24 is an optical drive 26, used for reading and writing data on the optical disks within the cartridges. The optical drive 26 is also attached to the system bus 14 through the SCSI interface 22 for transferring data between the drive 26 and the main memory 20 under control of the processing element 12.

The main memory 20 holds the programming instructions of the computer system 10, including an operating system 30 and user software 32. The operating system 30 and the user software 32 combine to control the selection of cartridges within the autochanger 25, and the reading and writing of data by the optical drive 26.

Figure 2:
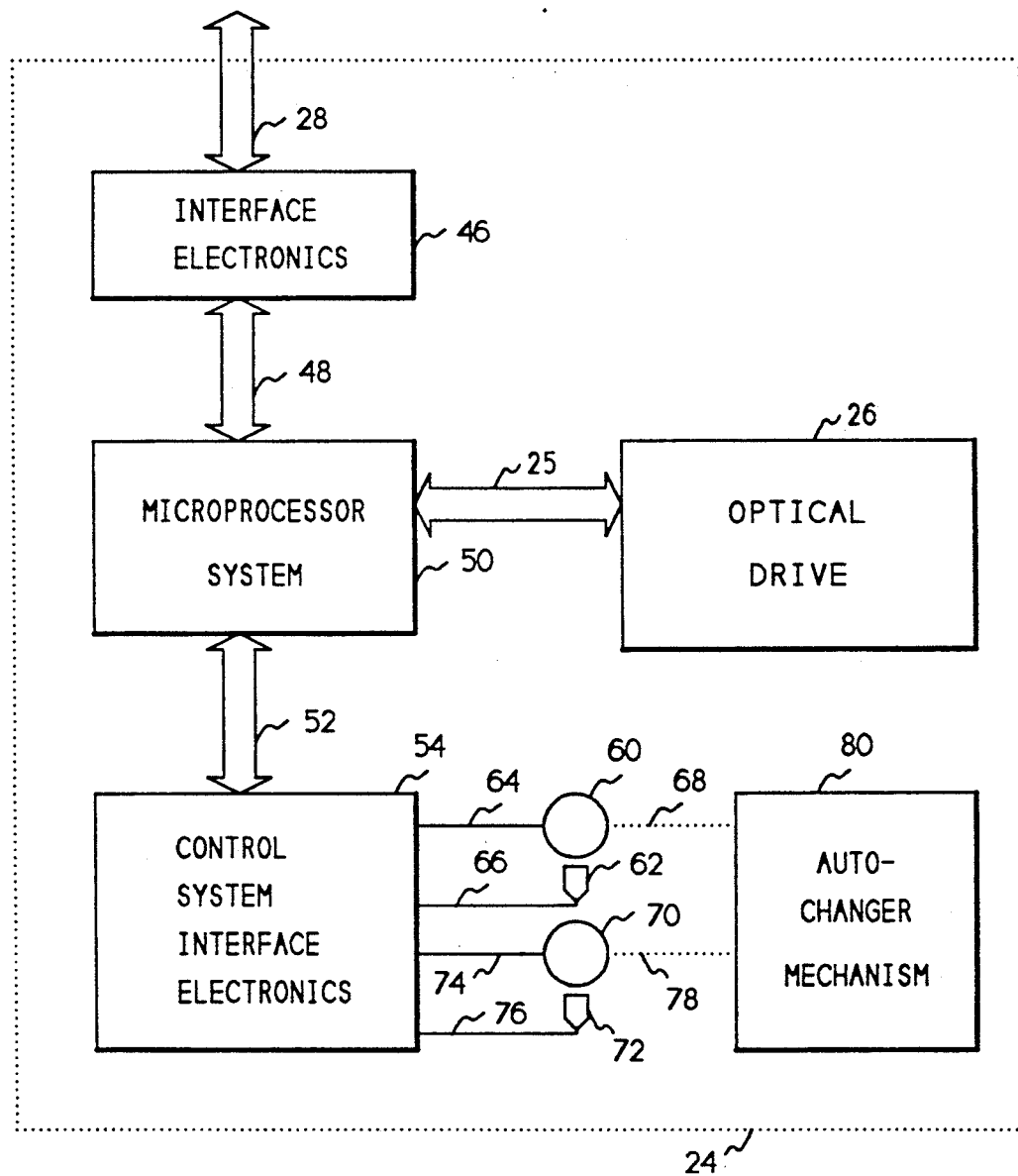
FIG. 2 shows a high level block diagram of the electronics of the present invention.

FIG. 2 shows a high level block diagram of the autochanger 24. An interface bus 28 connects the interface 22 (FIG. 1) to the autochanger interface electronics 46. A microprocessor system 50 connects to the interface 46 through a bus 48. The microprocessor 50 also connects to control system electronics 54 through a bus 52. The microprocessor 50 receives commands from the computer system 10 (FIG. 1) through the bus 28, interface 46, and bus 48. These commands direct the autochanger 24 to move cartridges between cells and the optical drive 26 as well as enter and eject cartridges through the mail slot (not shown). The microprocessor performs these commands by directing two control systems within the autochanger. The control systems have interface electronics 54 which are connected to two motors to drive the mechanical assemblies of the autochanger. The electronics 54 drives a first motor 60 through a pair of connections 64 and receives positional feedback from a shaft encoder 62 via signals 66. The motor 60 is mechanically connected to the autochanger mechanical assemblies 80 through a motor shaft 68. The electronics 54 also drives a second motor 70 through connections 74 and receives positional feedback from a shaft encoder 72 via signals 76. This second motor is mechanically connected to the autochanger mechanical assemblies 80 through a motor shaft 78.

Figure 2A:
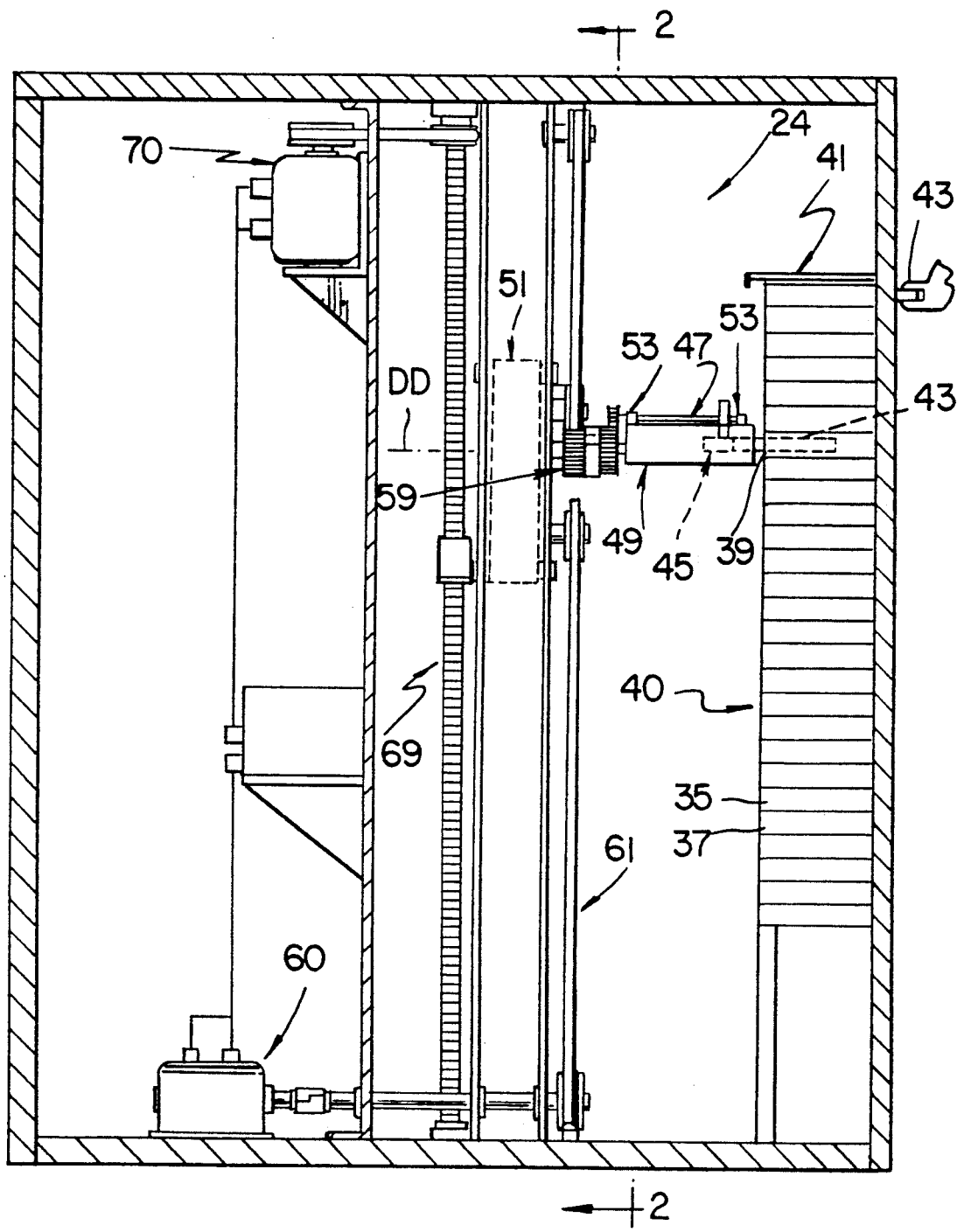
FIGS. 2A and 2B show the mechanical assemblies of the present invention.
Figure 2B:
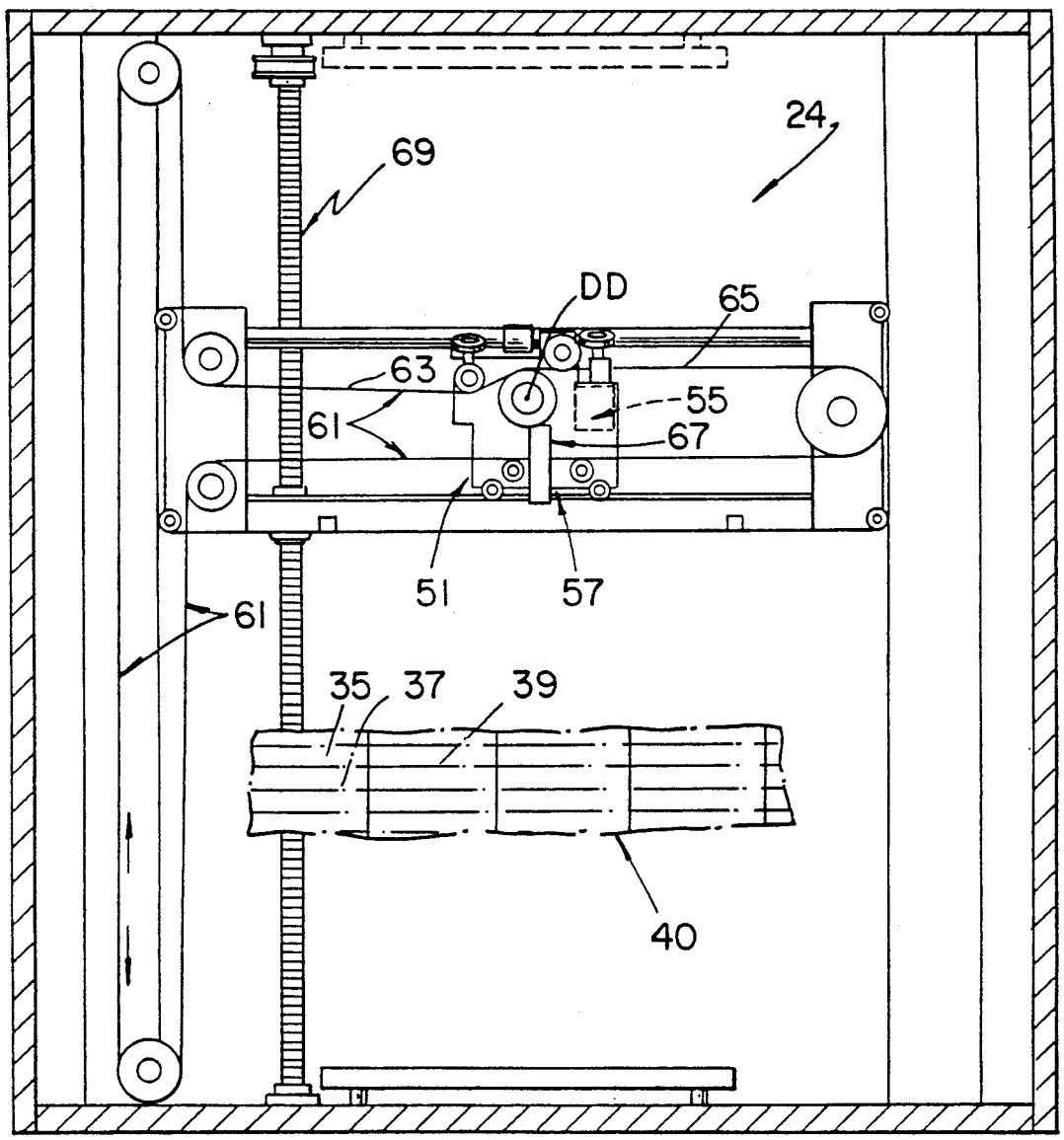

FIGS. 2A and 2B illustrate the mechanical assemblies or mechanisms of the optical disk cartridge handling system 24 for use in association with a plurality of longitudinally extending, rearwardly opening, cells 35, 37, 39, etc., arranged in a laterally and vertically extending cell array 40.

The handling system 24 may comprise an insertion assembly 41 for receiving a cartridge 43 which is hand-inserted by a human operator with a first end of the cartridge positioned forwardly. The insertion assembly longitudinally and rotationally displaces the cartridge so as to present the cartridge to a cartridge engaging mechanism with the first end of the cartridge positioned towards the rear of the housing.

The cartridge engaging mechanism 45 is provided for engaging an exposed end portion of a cartridge positioned in the insertion assembly 41 or in another cell, e.g. 35, 37, 39.

A longitudinal displacement assembly 47 is operatively associated with the engaging mechanism for longitudinally displacing a cartridge 43 engaged by the engaging mechanism 45.

A flipping assembly 49 is operatively associated with the engaging assembly 45 and is used for invertingly rotating a cartridge engaged by the engaging mechanism about a longitudinally extending flip axis DD.

A lateral displacement assembly 51 is operatively associated with the engaging assembly 45 for laterally displacing a cartridge 43 engaged by the engaging mechanism.

A rotatable first motor assembly 60 is drivingly linked to the longitudinal displacement assembly 47, the flipping assembly 49, and the lateral displacement assembly 51 for providing driving force thereto.

Stop assembly 53 may be provided which limits the movement of the longitudinal displacement assembly 47.

A flip latch assembly 55 is provided which has a latched state and an unlatched state and which is operatively associated with the flipping assembly 49 for preventing rotation thereof when the flip latch assembly 55 is in the latched state.

A translation latch assembly 57 is provided which has a latched state and an unlatched state. The translation latch assembly is operatively associated with the lateral displacement assembly 51 for preventing lateral displacement thereof when the translation latch assembly is in the latched state.

The cartridge handling system 24 has a plunge operating state wherein the stop assembly 53 is in disengaged relationship with the longitudinal displacement assembly 47; the flip latch assembly 55 is in its latched state; and the translation latch assembly 57 is in its latched state. The cartridge handling system 24 comprises a flipping operating state wherein the stop assembly 53 is in engaged relationship with the longitudinal displacement assembly 47; the flip latch assembly 55 is in its unlatched state; and the translation latch assembly 57 is in its latched state. The cartridge handling system 24 also comprises a translation state wherein the translation latch assembly 57 is in its unlatched state.

A first gear assembly 59 is provided which is mounted in rotationally displaceable relationship with the lateral displacement assembly 51 and which is drivingly linked to the longitudinally displacement assembly 47 and the flipping assembly 49.

A continuous drive belt assembly 61 is provided which is continuously nonslippingly engaged with the first gear means 59 for drivingly linking the first gear assembly 59 with the first motor assembly 60. The continuous belt assembly may comprise a first portion 63 extending in a first lateral direction from the first gear assembly 59 and a second portion 65 extending in a second lateral direction from the first gear means. The lateral displacement assembly 51 is laterally displaceable through movement of the continuous belt assembly 61 when the first gear assembly 59 is locked against rotation.

A gear lock assembly 67 having a locked state and an unlocked state is provided which is operatively associated with the first gear assembly 59. The gear lock assembly 67 prevents rotation of the first gear assembly 59 when the gear lock assembly is in its locked state. The cartridge handling system 24 is constructed and arranged such that the gear lock assembly 67 is in its locked state when the translation latch assembly 57 is in its unlatched state, and such that the gear lock assembly 67 is in its unlocked state when the translation latch assembly 57 is in its latched state.

The optical disk cartridge handling system 24 also comprises a vertical displacement assembly 69 for vertically displacing a cartridge 43 engaged by the cartridge engaging assembly 45. A second motor 70 is operatively associated with the vertical displacement assembly 69 for providing driving force thereto.

Figure 3:
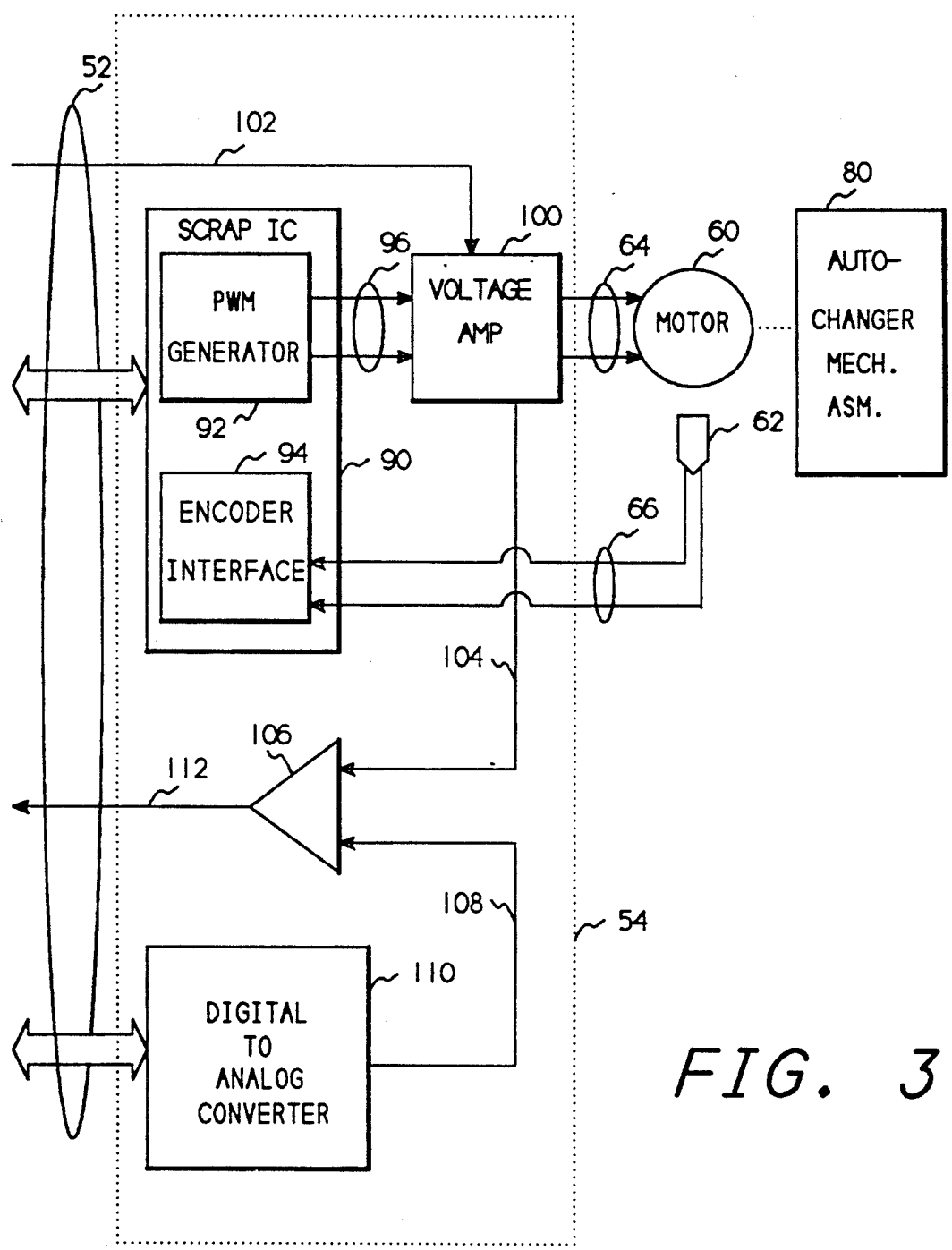
FIG. 3 is a detailed block diagram of the control system interface electronics of the invention.

FIG. 3 depicts a detailed block diagram of the control system electronics, motors, and mechanical assemblies illustrating one of the two control systems of the invention. The method used to drive the motors in the control systems is pulse width modulation ("PWM"), which is commonly used for similar control systems. This method involves controlling motor speed by varying the duty cycle of a constant voltage pulse supplied to the motor, rather than varying the amount of the voltage. Although the PWM method is illustrated, other methods of controlling the motor speed could be used within the scope of the present invention.

Referring now to FIG. 3, the bus 52 transfers data from the microprocessor 50 (FIG. 2) to a pulse width modulation integrated circuit ("IC") 90, which is commercially available as Hewlett Packard part number HCTL-1000. Similar integrated circuits that perform the same functions are available from other manufacturers, such as Motorola part number MC33030, or Silicon General part number SG1731. The IC 90 directly interfaces to the microprocessor bus 52 to allow the microprocessor to write to registers or read from registers within the IC 90 to perform functions necessary to create the PWM output of the IC 90. A PWM generator circuit 92 within the IC 90 accepts a datum from the bus 52 and converts this datum into two, time varying, output signals 96 which are connected to a voltage amplifier 100. Only one of the signals 96 is active at a time, based on the polarity of the datum, and this active signal has a duty cycle which is proportional to the value of the datum—the larger the value, the longer the duty cycle. The signals 96 are amplified by the voltage amplifier 100 to a level suitable for driving the motor 60. The voltage amplifier 100 can be enabled or disabled from the microprocessor by signal 102.

A shaft encoder 62 (also shown in FIG. 2) is a commercially available part that provides a two channel output of the angular position of the motor shaft. Examples of this part are Hewlett Packard part numbers HEDS-5500, HEDS-6000, and HEDS-9000. The shaft encoder 62 is mounted on the shaft of the motor 60 to form a self contained unit. Inside the shaft encoder is an encoder disc (not shown) with a photo transmitter (not shown) on one side of the disc, and a photo receiver (not shown) on the opposite side of the disc. The disc is transparent except for a series of dark lines printed or etched on its surface. Light from the phototransmitter shines through the disc and as the shaft rotates, a pulse train is generated by the dark lines interrupting the light. Two receivers are used, spaced 90 degrees apart, so the two output channels from the receivers can be used to detect the direction of rotation. The pulse train output by the two channels is fed to an encoder interface and counter section 94 of the IC 90. The phase relationship of the two channels determines whether the motor is rotating clockwise or counterclockwise. The IC 90 decodes the phase and counts the number of pulses generated by the shaft encoder 62 and presents this data to the bus 52 for processing by the microprocessor 50. By obtaining the encoder 62 data from the IC 90, the microprocessor determines the speed and direction of rotation of the motor 60. Counters in the encoder interface 94 also maintain motor shaft position.

The control system interface electronics 54 also includes a means of converting the current running through the motor 60 into a signal which the microprocessor can use to determine the amount of such current. The method measures voltage across a sampling resistor (not shown), in series with the motor leads 64, by inputting this voltage 104 into a differential amplifier 106. There it is compared to a known voltage signal output by a digital to analog converter circuit ("DAC") 110. The microprocessor 50 sends data to the DAC 110 which converts the data to an analog signal 108. This signal 108 is compared by the differential amplifier 106 to the voltage signal 104 that represents motor current. The output signal 112 of the differential amplifier 106 is read by the microprocessor 50 to determine if the DAC output 108 is greater than or less than the voltage value 104 for the motor current. In this way, the microprocessor 50 can change the DAC 110 value until the signal 112 changes value, thus determining the motor current.

Figure 4:
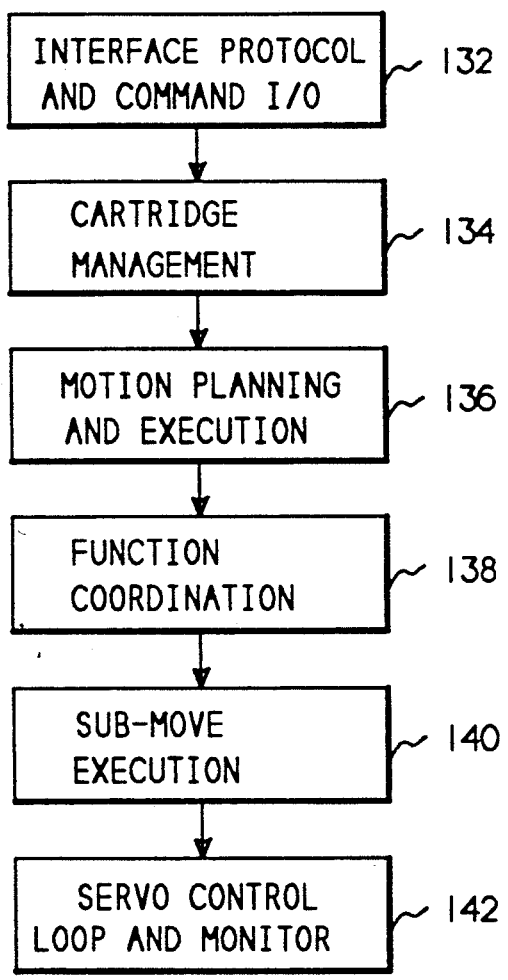
FIG. 4 is a flow diagram of the major modules of the software of the present invention.

FIG. 4 is a high level block diagram of the function to function flow of the software of the present invention. Block 132, interface protocol and command I/0, interacts with the interface electronics 46 (FIG. 2) to receive commands from the computer system 10 (FIG. 1), and to transmit status back to the computer system 10. Block 132 passes the commands to the cartridge management block 134 which is responsible for keeping the logical arrangement of all locations and their corresponding status. Block 134 also translates interface commands from the computer system into autochanger internal command structures that are passed to the motion planning and execution function, block 136. This function transforms a command structure into a series of autochanger sub-commands that will perform the command. Block 136 also sequences the sub-commands to perform the command in the most time-optimal way. Block 138, function coordination, coordinates the series of sub-commands in order to execute the command by modifying the operation of the control systems to properly move each of the required mechanical assemblies. The sub-move execution block 140 performs the lowest level motion in the autochanger in order to perform each sub-command. It coordinates the input position to each of the control systems and generates a move profile for each input based on given acceleration, peak velocity, and force parameters which were supplied by blocks 136 and 138. The servo control loop and monitor, block 142, interfaces with the control system electronics 54 (FIG. 2) to control the position of the motors in the two control systems through a digital compensation algorithm. This block also maintains position, force and velocity data for the two control systems, and it monitors the systems and disables power to the systems if abnormal or unexpected conditions arise.

Figure 5:
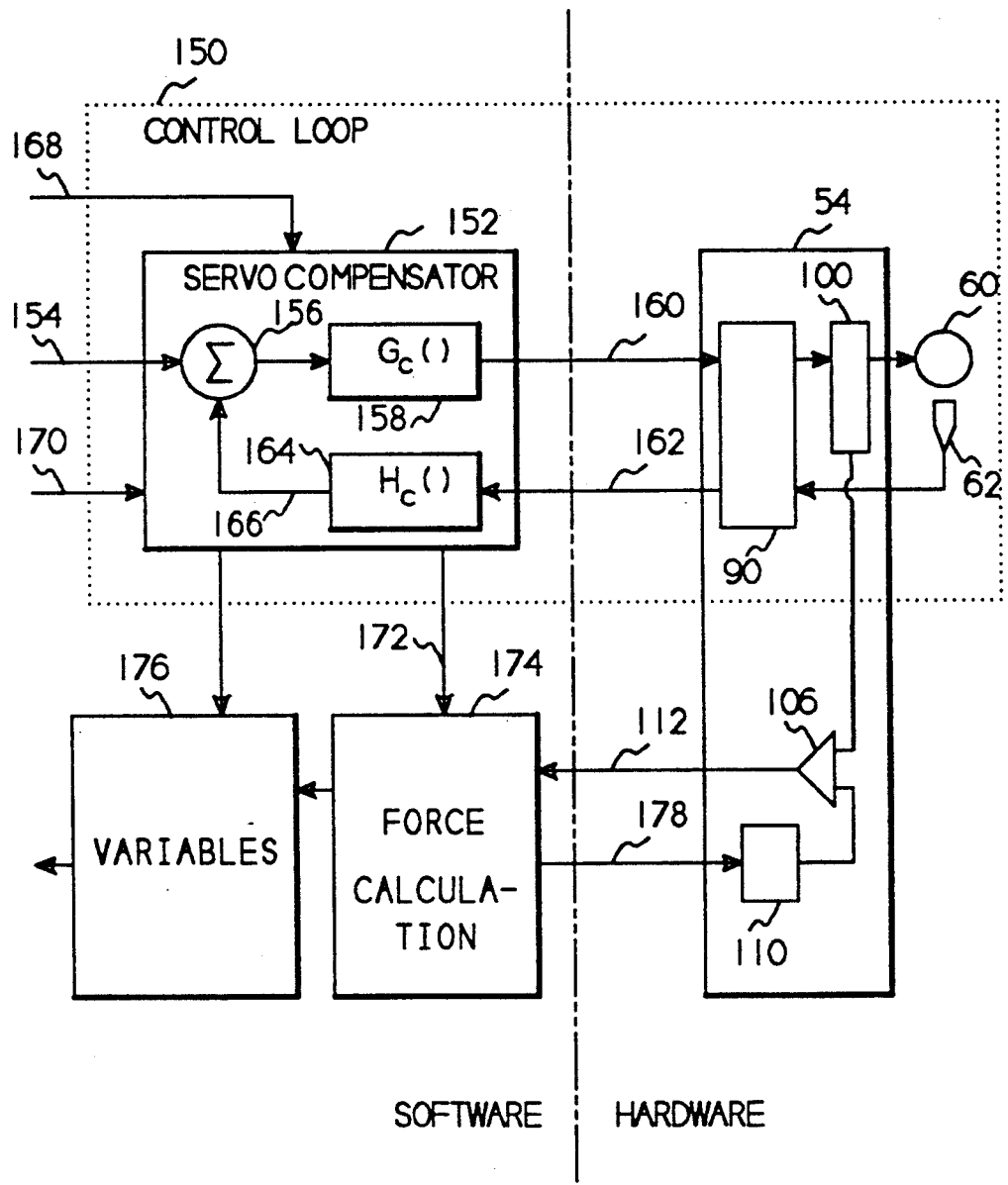
FIG. 5 is a diagram of the servo control system of the present invention.

FIG. 5 shows the servo control system of the present invention. A conventional digital servo control loop 150 is used to control a motor for a control system. The present invention has two such control loops, designated Y control loop, and Z control loop. Each control loop has a servo compensator 152 which inputs a position signal 154 to a summing junction 156. The output of the summing junction 156 is fed to an output transfer function $G_c()$ which converts the output of the summing junction 156 to a signal 160 by multiplying the output 156 by a constant $K_p$. $K_p$ is shown in table 1 for each move of each control system. The resulting value is fed to the IC 90 in the control system interface electronics 54. The signal is then amplified by the amplifier 100 and input to the motor 60. A shaft encoder 62 sends information to the IC 90 which feeds position and velocity information through signal 162 to the feedback transfer function $H_c()$ 164. The feedback transfer function 164 converts the position and velocity information into a negative feedback signal 166 which is input to the summing junction 156. The function $H_c()$ is:

$$H_c() = 1 + K_v d/dt$$

where $d/dt$ is the derivative of the input 162 and $k_v$ is a constant value. $K_v$ is shown in table 1 for each move of each control system. Thus $H_c()$ adds the output position to the derivative of the output position times a constant $K_v$. The values for $K_p$ and $K_v$ depend upon the accuracy and stability requirements for the systems. Increasing $K_p$ reduces position error. Both $K_p$ and $K_v$ determine the control system's stability and performance. In this manner, the control loop 152 changes the position of the motor 60 whenever a new position is received on line 154. As will be described later, the motor 60 may have different loads at different times. To compensate for these different loads, the different compensator values $K_p$ and $K_v$ may be input to the servo compensator 152 by a compensator values signal 168. Also, in the event software determines that the control system must be stopped, a shutdown signal 170 is input to the servo compensator 152 to cause the shutdown.

The force calculation module 174 determines the amount of force being exerted by the motor. It receives compensator values and motor speed from the compensator 152 through signal 172. The mechanical sense of touch is the calculation of forces being exerted by the autochanger's control systems and the ways in which the force information is used during the autochanger's operation. This mechanical sense of touch uses knowledge of the mechanical parameters of the system to derive the amount of force being exerted by the systems' motors onto the mechanics. A periodic calculation of the force is made by the force calculation module 174 and is made available to other software modules within the system by placing the force information into a variables memory area 176. This force information is used by the other software modules as a sensing mechanism for positional feedback and for detection of abnormal situations within the autochanger. Force is directly related to motor torque by the equation $$F = T_m/r$$

where F is the exerted force created by the motor torque, $T_m$, operating at an effective radius r, where r is determined by the gearing used to attach the autochanger mechanics to the motor assembly, and / represents division. Motor torque is directly related to motor current by the equation $$T_m = I_m * K_t$$

where $I_m$ is the instantaneous motor current and $K_t$ is the motor's torque constant, and * represents multiplication.

Motor current can be calculated by direct measurement via electronics, or by calculation from knowledge of motor voltage and motor speed. The resulting equation becomes $$\begin{aligned} F &= T_m/r \\ &= (K_t/r)*I \end{aligned}$$

In the present invention, the direct measurement is accomplished by a combination of electronics and software. As described above with reference to FIG. 3, a voltage proportional to motor current from the amplifier 100 is compared to the output of a DAC 110 by a differential amplifier 106. The force calculation module 174 sends a value to the DAC 110 via signal 178, and receives the comparison of this value to the voltage proportional to the motor current via signal 112. The software 174 changes this value until the signal 112 indicates an equal comparison, then the value represents the motor current. Since $K_t$ and r are constants, a new constant K can be calculated in advance, and the resulting equation is $$F = K*I$$

Motor current can also be calculated by the equation $$I_m = (V_m - (K_t * w))/R$$

where $V_m$ is the motor voltage, $K_t$ is the torque constant of the motor, R is the resistance of the motor and associated driver circuits for the motor, and w is the radian velocity of the motor shaft. Since a digital controller is used in the control loop 150, $V_m$ and w are already available in digital form. A simple calculation of the force is made via the equation:

$$\begin{aligned} F_m &= (K_t/(r*R)) * (V_m - (K_t * w)) \\ &= (K_1 * V_m) - (K_2 * w) \end{aligned}$$

where $K_1 = K_t/(r*R)$ and $K_2 = K_t^2/(r*R)$.

As will be described below, force information is used extensively throughout the controller software as a form of feedback and obstacle detection. The controller can sense the completion of an operation by monitoring the force at strategic times during execution of an operation. The controller can adjust the movements of the motors until a desired force or opposition is obtained. Abnormal situations, which warrant immediate stoppage of all movements, can also be detected by monitoring the force.

After calculation, the force is stored in the variables memory area 176. If an error is detected, a state update flag within the variables 176 is set. When the state update flag is set, the system will no longer update the variables, thus preserving the state of the control systems at the time of the error. In this manner, the state of the machine at the time of the error is available for use by the error recovery system.

BASIC OPERATIONS

Figure 6:
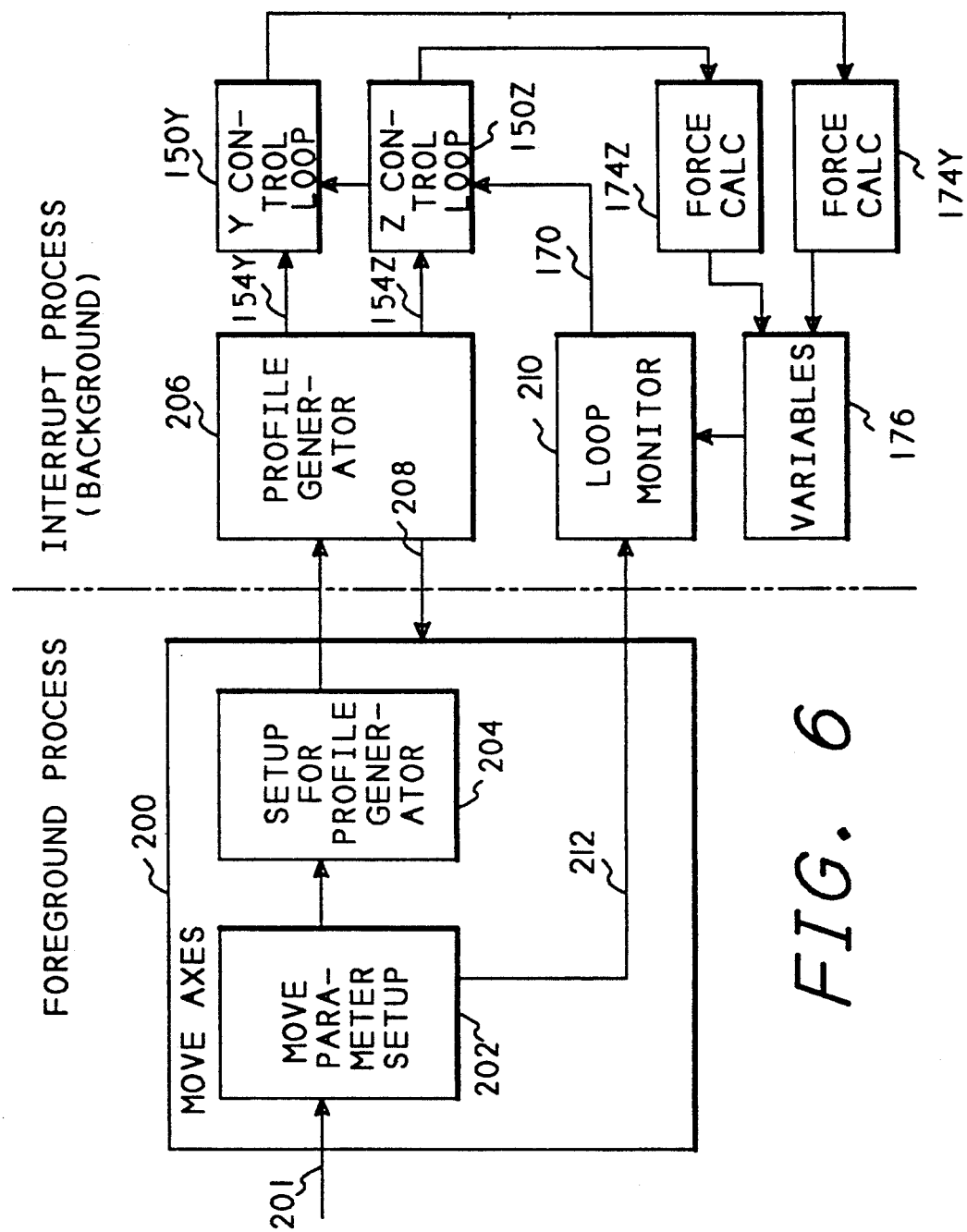
FIG. 6 is a block diagram of the major modules and data flow involved in a move operation.

Referring now to FIG. 6, a block diagram showing the major modules and data flow involved in a move operation is depicted. A move axes module 200, which is one of the sub-move execution modules 140 (FIG. 4), receives input parameters 201 containing delta Y, delta Z, and ID values. Delta Y and delta Z are the number of shaft encoder counts between the current position and the new position. The ID value is used as an index into a look-up table to retrieve the force values that are then passed to loop monitor 210 through signal 212. The table also provides acceleration, in millimeters per second per second, and velocity in millimeters per second, for input to block 204. Table 1 shows the force values, acceleration (Accel) and velocity ($V_p$) for each of the control systems operations. Block 204 converts the acceleration and velocity parameters into data for the profile generator, and provides scaling information for the profile generator. Block 204 then initiates the movement. Once the movement is started, periodic timer interrupts will transfer control to the profile generator 206. Using the parameters passed from block 204, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 202, shutdown force settings were passed to loop monitor 210 via signal 212. The loop monitor 210, described below, compares the shutdown force settings to the forces in the memory variables 176, and shuts down the control loops 150Y and 150Z if the forces exceed safe limits. When the control loops are shut down, the state update flag is set to prevent further updates to the variables 176. When the movement is complete, a done signal 208 is returned to the move axes module 200 which, in turn, notifies its caller that the move is complete. Note that the profile generator, control loops, and loop monitor run as background, interrupt driven modules, so the control system is constantly being serviced.

Figure 7:
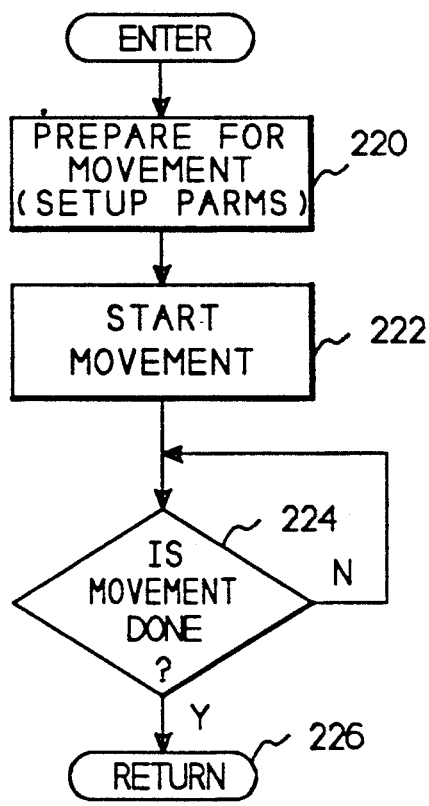
FIG. 7 is a flowchart of a move operation.

FIG. 7 depicts the move axes module process as a control flowchart. After entry, block 220 prepares for movement by setting up the move parameters and the profile generator, block 222 starts the movement, and block 224 just waits on the background processes to complete the move. After completion, control is returned to the caller at block 226.

Figure 8:
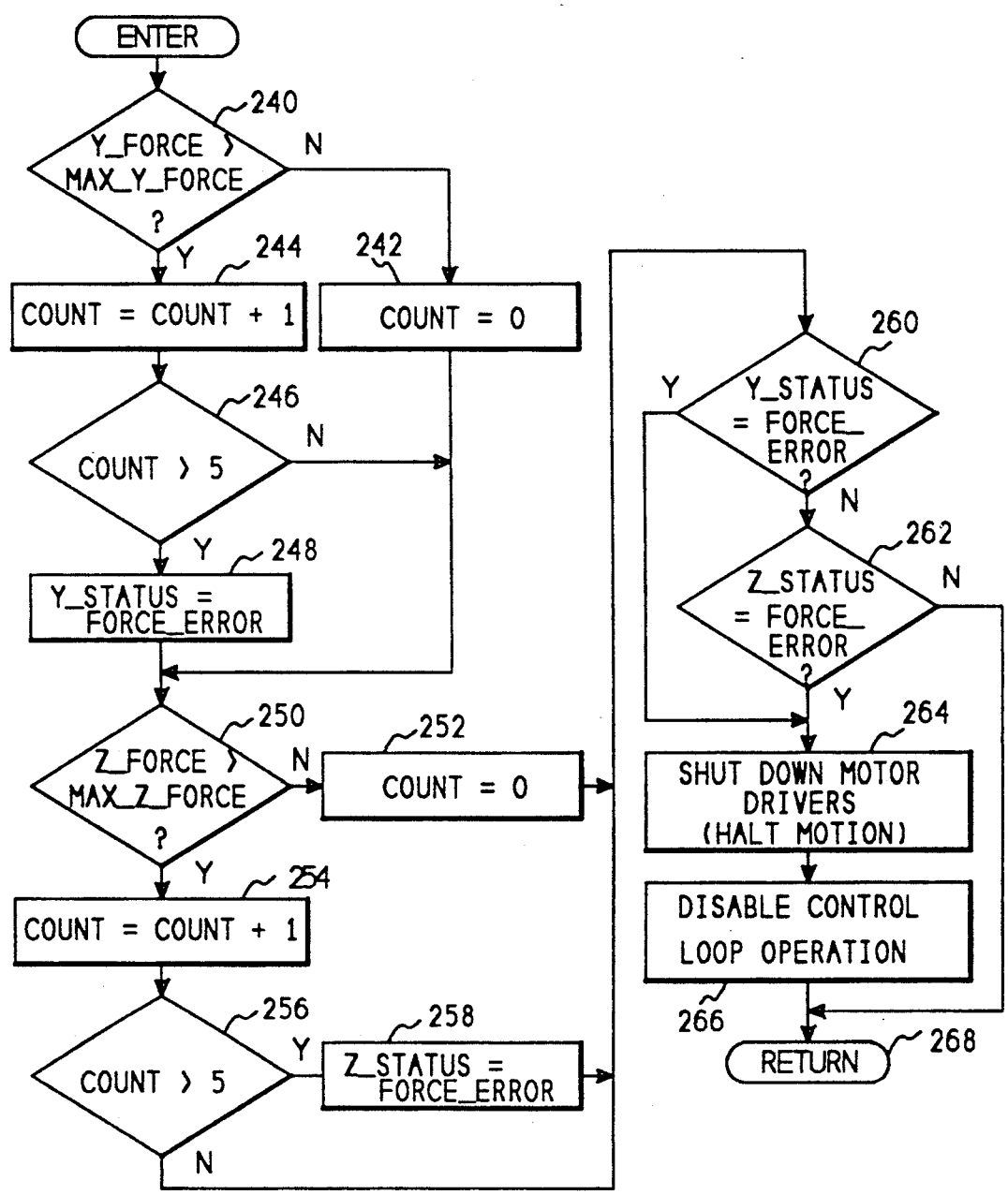
FIG. 8 is a flowchart of the loop monitor that continuously monitors the forces exerted by the control systems.

FIG. 8 is a flowchart of the loop monitor block 210 (FIG. 6). This module receives maximum force parameters from the move parameter setup block 202 and compares these force values with the force being exerted by the motors, each time it receives control. If the force being exerted exceeds the maximum values, the control systems are both shut down. Referring now to FIG. 8, after entry via a timer interrupt, block 240 compares the force being exerted by the Y control system to the maximum Y force passed from the move parameter setup. If the force is less than or equal to maximum Y force, control transfers to block 242 where a count value is set to zero. The count is used to allow the force to exceed the maximum value for a short period of time without causing shutdown, however, if the force exceeds the maximum value for a longer period, a shutdown will occur. To ensure that the high force occurs over a long period of time, the module sets the count value to zero anytime it gets control and the force is below the maximum.

If the force is greater than the maximum, block 244 increments the count, then block 246 evaluates the count. If the count is greater than a value necessary to ensure that the count has been high for the maximum time allowed, control transfers to block 248 where Y__ status is set to force__error, which will cause shutdown. In either case, control transfers to block 250 where the Z force is compared to the maximum Z force. If Z force is less than the maximum, block 252 sets the count to zero, otherwise, block 254 increments the count. Block 256 evaluates the count and if it is large enough, control transfers to block 258 to set Z__status to force__error, which will cause a shutdown.

Control then goes to block 260 and block 262 to check for either a Y__status of force__error or a Z__. Status of force__error. If either condition is true, control goes to block 264 to shut down the motor drivers to halt motion, then block 266 disables the control loop so that no new commands go to the motors. If neither block 260 nor block 262 detect an error condition, or after a shutdown, control transfers to block 268 to return from the interrupt.

Figure 9:
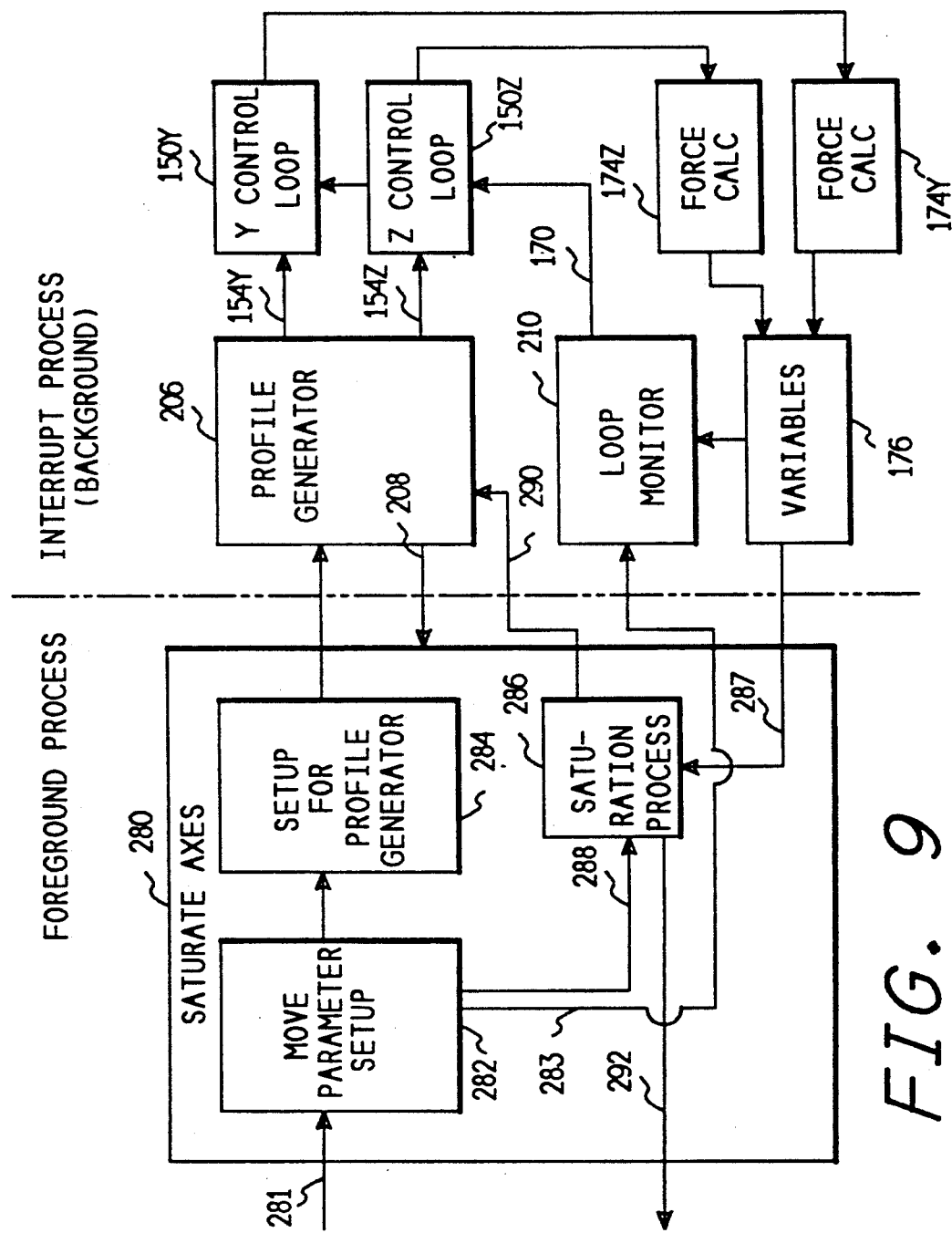
FIG. 9 is a block diagram of the major modules and data flow involved in a saturate operation.

FIG. 9 is a block diagram of a saturate axes operation showing data flow. This operation is like a move operation, except that movement stops either when the destination is reached, or upon detection of a specified force opposing the movement. Referring now to FIG. 9, a saturate axes module 280, which is one of the sub-move execution modules 140 (FIG. 4), receives input parameters 281 containing delta Y, delta Z, and ID values. Delta Y and delta Z are the number of shaft encoder counts between the current position and the new position. The ID value is used as an index into a look-up table to retrieve the force values that are then passed to loop monitor 210 through signal 283. The table also provides acceleration, in millimeters per second per second, and velocity in millimeters per second, for input to block 284. Block 284 converts the acceleration and velocity parameters into data for the profile generator, and provides scaling information for the profile generator. Block 284 then initiates the movement. Once the movement is started, periodic timer interrupts will transfer control to the profile generator 206, which is the same as the profile generator of FIG. 6. Using the parameters passed from block 284, the profile generator 206 dynamically builds a position profile of how the movement should occur. This profile includes Y and Z positions over time, and these positions are passed to the Y control loop 150Y via signal 154Y, and to the Z control loop 150Z via signal 154Z. The control loops were described with reference to FIG. 5. As movement of the mechanisms occurs, the control loops send information to force calculation modules 174Y and 174Z (which were described with reference to FIG. 5), that store force information in the memory variables 176. When the setup was being performed by block 282, shutdown force settings, which are twice the value of the threshold force settings, were passed to the saturation process 286 via signal 288. Threshold force settings were passed to loop monitor 210 via signal 283. The loop monitor 210, described above, compares the shutdown force settings to the forces in the memory variables 176, and shuts down the control loops 150Y and 150Z if the forces exceed safe limits. When the control loops are shut down, the state update flag is set to prevent further updates to the variables 176. When the movement is complete, a done signal 208 is returned to the saturate axes module 200 which, in turn, notifies its caller that the operation is complete. The saturate process 286 also monitors variables 176, via signal 287, to determine when they exceed the threshold values passed from block 282, and when either force exceeds the threshold, movement is stopped through the stop signal 290. At this time saturate status is made available through status signal 292. Note that the profile generator, control loops, and loop monitor run as background, interrupt driven modules, so the control system is constantly being serviced. The saturate process runs in a foreground loop.

Figure 10:
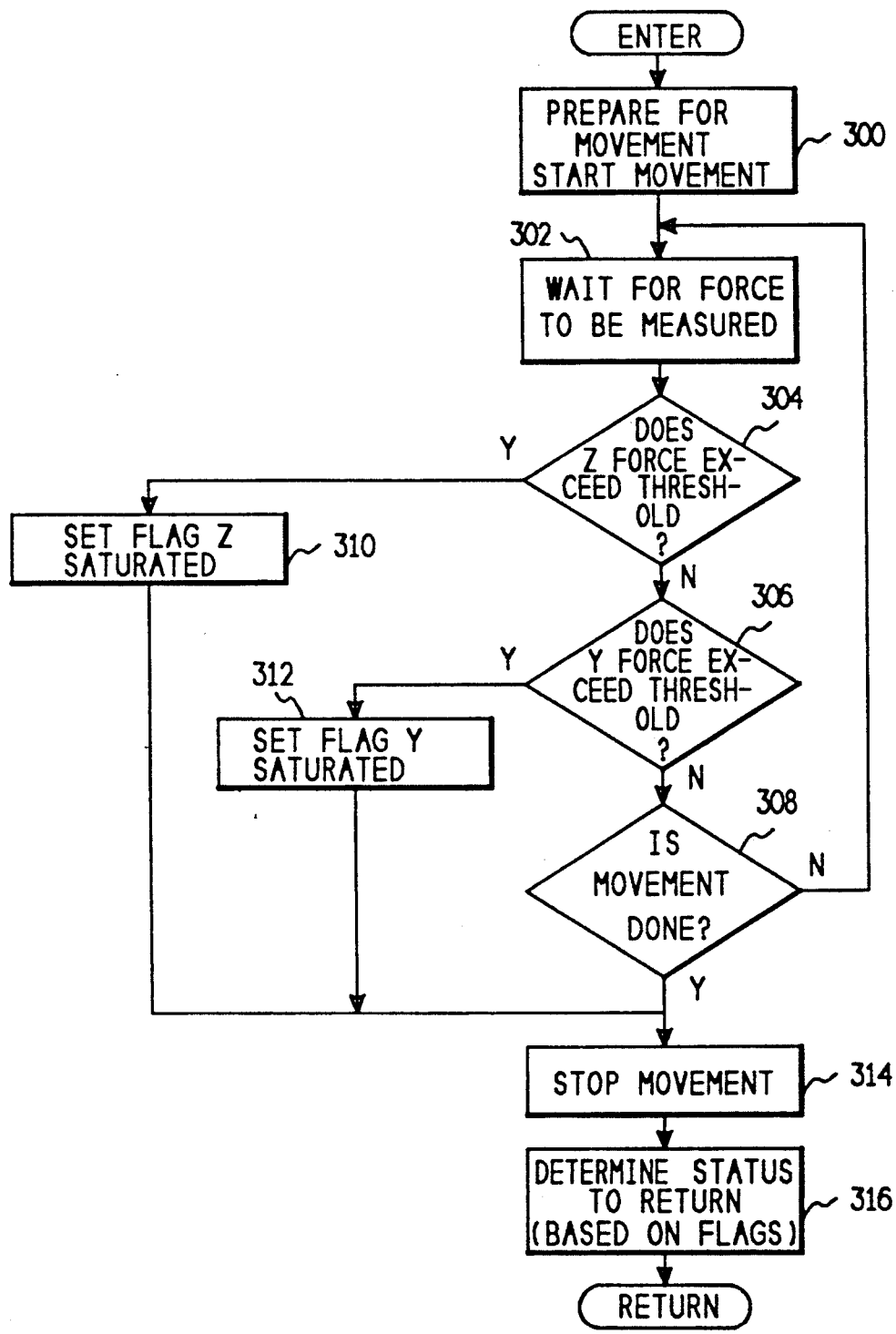
FIG. 10 is a flowchart of the saturate operation.

FIG. 10 is a flowchart of the saturate axes operation. After entry, block 300 prepares for movement by processing the input parameters, delta Y and delta Z, passing shutdown force values to the loop monitor, profile parameters to the profile generator, threshold force values to the saturation process, and then starting the movement. Block 302 waits for a force value to be measured (by the timer interrupt driven force calculation modules), then block 304 determines if the Z force exceeded the Z threshold. If the force did not exceed the threshold, control passes to block 306 to check the Y force value against the Y threshold parameters. If both forces are less then the threshold, control goes to block 308 to determine if the movement is done, that is, has the movement reached the final position. If the movement is not done, control goes back to block 302 to perform the same checks. If the Z force exceeds the threshold, control goes to block 310 to set the Z saturated flag; if the Y force exceeds the threshold, control goes go block 312 to set the Y saturated flag. In either case, or if movement is done, control goes to block 314 to stop movement. Block 316 then determines status to return and returns to the caller.

The move axes and saturate axes routines described above will be used in the following routines that perform specific operations. Each of the following specific move routines are part of the function coordination routines 138 of FIG. 4. In the following descriptions, note that the Y control system moves the engaging, flipping and longitudinally displacing apparatus, also called the transport, vertically, and the Z control system plunges the engaging mechanism inward to retrieve a cartridge, plunges the engaging mechanism outward, flips the transport, and performs the translation movement of the transport. The Z control system also moves the cartridge insertion mechanism of the mail slot. For a more complete description of the mechanical assemblies of the invention, refer to the foregoing patent application (E).

ERROR RECOVERY

The highest level motion control software, which is part of the motion planning and execution 136 (FIG. 4), receives a command from the host and executes this command by calling functions specifically tailored for each command. When these functions return after completing the command, error recovery is called to determine whether error recovery operations are necessary. If the command was successful, error recovery sets up a good status for the original command and returns. If the command was not successful, error recovery recalibrates the autochanger and invokes one of a plurality of state machines, based on the original command, which will generate new commands that are passed back to the highest level motion control software for execution. After these new commands are executed, error recovery again gets control and evaluates the results. In this manner, error recovery continues in the state machine until it has successfully completed the original command or it has exhausted all possible attempts.

Figure 11:
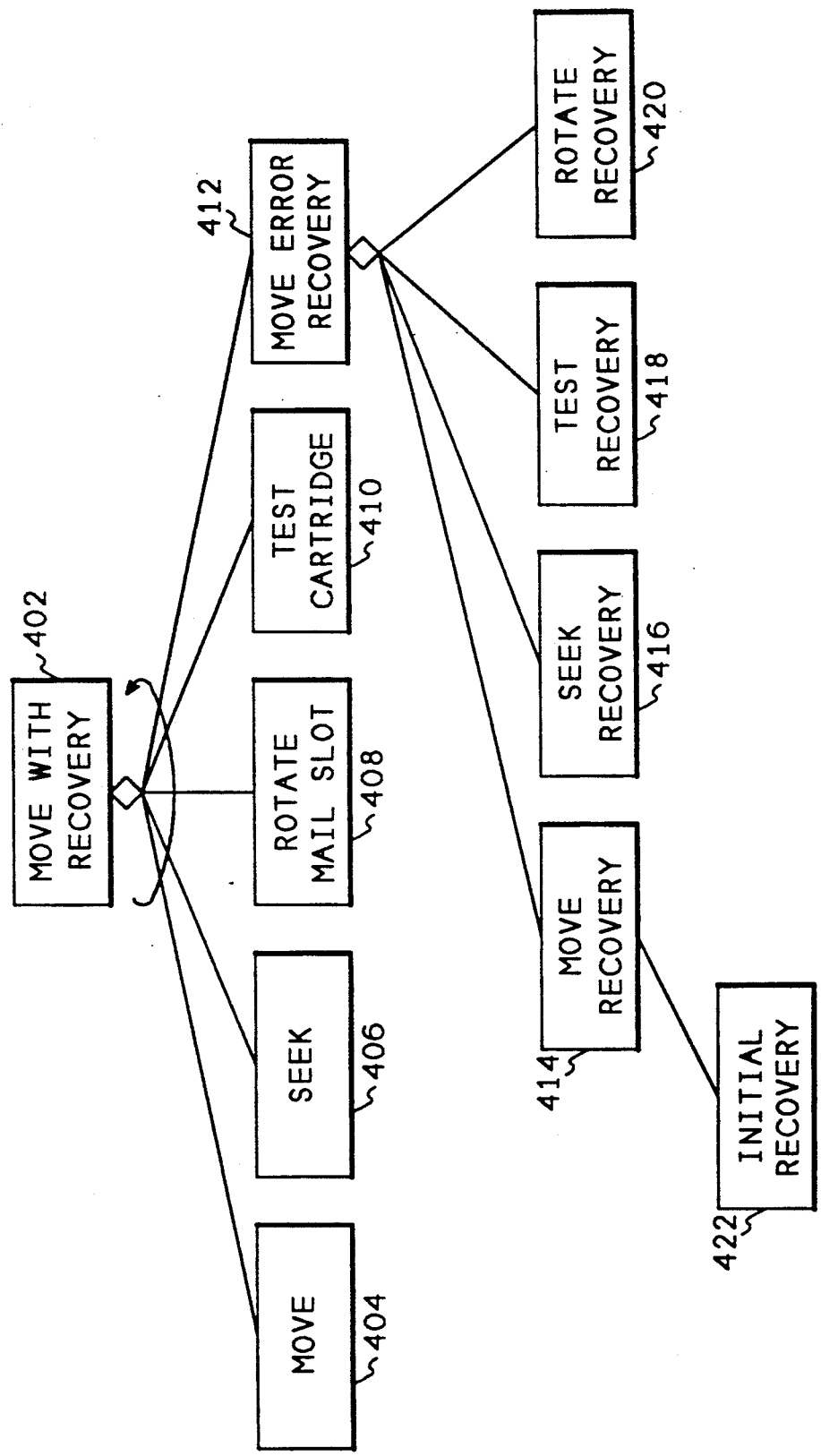
FIG. 11 is a hierarchy diagram of the move with recovery operation, illustrating error recovery.

FIG. 11 shows a hierarchy diagram of the move with recovery function, showing all of the functions called to complete each individual type of move, and also showing the error recovery functions that are called. Referring now to FIG. 11, block 402 which receives a command from the host system, is a part of the motion planning and execution block 136 of FIG. 4. Block 402 evaluates the command and calls one of the function coordination modules to perform the command. Block 404 will be called if the command is to move a cartridge, block 406 if the command is to seek to a cartridge location, block 408 if the command is to rotate the mail slot, and block 410 will be called to test whether a cartridge is present at a location. After the appropriate function coordination module has completed the command, control returns to move with recovery 402 which then calls move error recovery 412 to determine the success of the original move. If the original command was performed without error, move error recovery 412 sets a flag which will cause move with recovery 402 to terminate. If the original command had an error, move error recovery 412 will recalibrate the autochanger and generate a new command for execution by move with recovery 402. Move with recovery 402 then executes this new command and passes the results back to move error recovery 412. Move error recovery 412 uses the results, along with the current autochanger state and the original command, to generate more commands to be executed. Commands are generated and executed until the original operation is successfully performed or until a fixed number of attempts have been made. If move error recovery 412 is unable to complete the original command, it will try to restore the autochanger to its original state before the original command was attempted. An important feature of this technique is that it allows separation of the error recovery process from normal command execution. The two processes exist with very little coupling and have a single interface, the original command. The technique capitalizes on the fact that the function coordination modules can be used by error recovery to perform corrections for errors encountered during execution of a command. The ability to reuse the function coordination modules allows error recovery to be simplified because it does not have to perform physical functions, it only has to set up logical parameters and re-execute the function coordination code.

When move error recovery 412 determines that an error has occurred, it will evaluate the original command and call one of the four recovery functions based on the type of the original command. Move recovery 414 will recover from all original move commands, seek recovery 416 will recover from all original seeks, test recovery 418 will recover from all original test cartridge commands, and rotate recovery 420 will recover from all original rotate mail slot commands. Each of these four recovery functions performs a state machine, as will be described below, and each will call the initial recovery function 422, here illustrated being called by move recovery 414.

Figure 12:
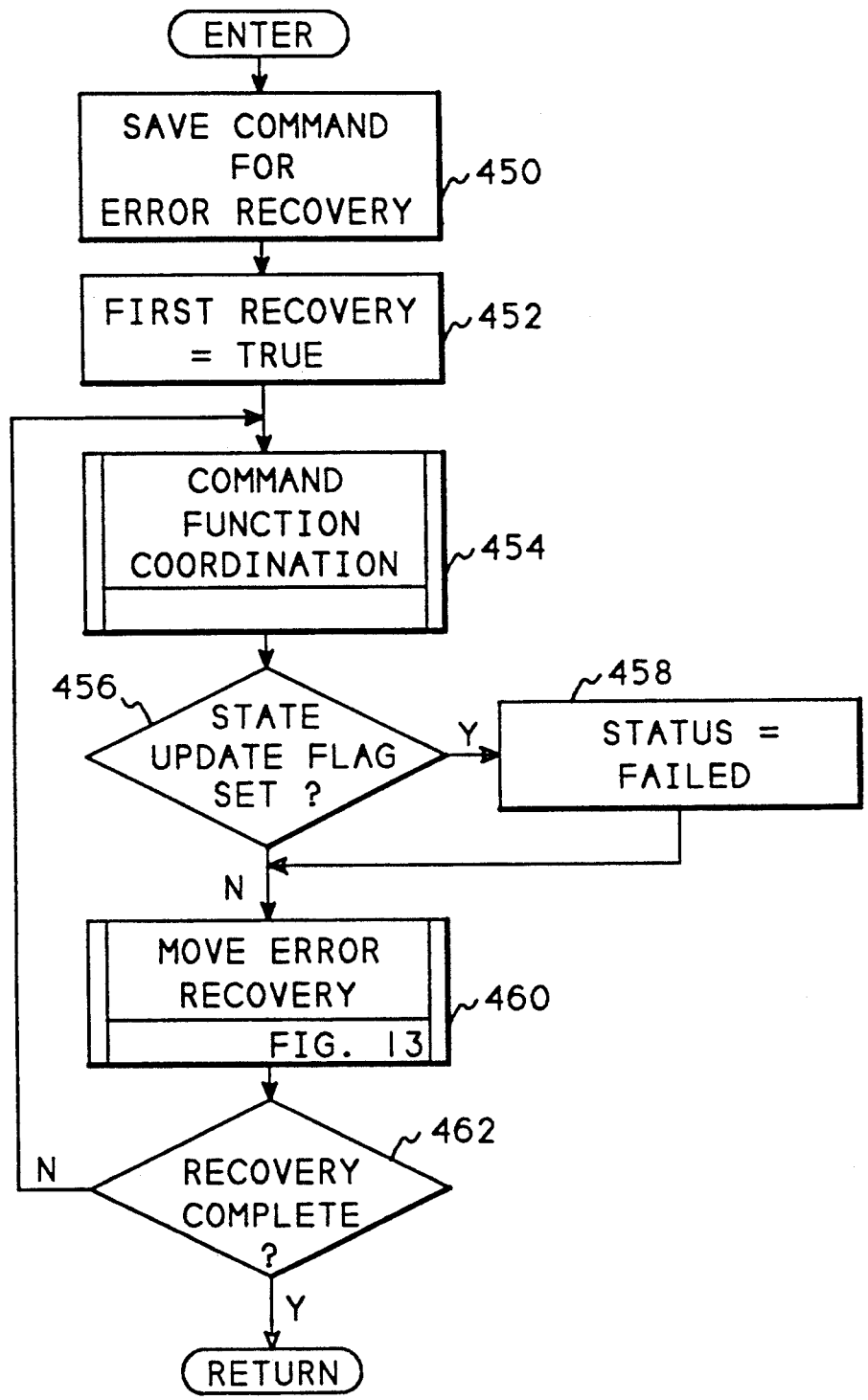
FIG. 12 is a flowchart of the top level module of the hierarchy diagram of FIG. 11.

FIG. 12 is a flowchart of the move with recovery function 402 of FIG. 11, and shows the error recovery loop of the present invention. Referring now FIG. 12, after entry, block 450 saves the original command for use by error recovery. Block 452 sets a first recovery flag to "true". This flag is used to indicate the status of error recovery. Block 454 then calls the appropriate command function to perform the original command. The function called by block 454 is dependant on the original command, and will be one of the four function coordination modules, move cartridge 404, seek cartridge 406, rotate mail slot 408, or test cartridge 410, of FIG. 11. The command function coordination module will execute the original command and attempt to perform the operation by calling the move axis module of FIG. 7, or the saturate axis module of FIG. 10, or both. These modules will, in turn, use the background interrupt process depicted in FIGS. 6 and 9, and these processes may encounter an error during the move. Should the background process (of FIGS. 6 or 9) encounter an error, it will set the state update flag in the variables 176 (FIG. 6 and FIG. 9), to shut down the control systems. After the control systems are shut down, the command function coordination module will continue to completion and return to block 456 of FIG. 12 which checks the state update flag to determine whether it has been set. If the state update flag has been set, block 456 transfers to block 458 to set status to "failed". In either case, however, block 460 calls move error recovery, FIG. 13, to determine the success of the previous operation. If the original command was successful, block 462, upon return from FIG. 13, will detect that recovery is complete and return to the caller. If, however, an error occurred in the original move, recovery will not be complete and block 462 will transfer back to block 454 to perform any commands requested by the move error recovery and the recovery functions. Block 454 will again call the command function coordination module appropriate to perform the command requested by error recovery and, upon return, check the state flag and call error recovery again. This loop will continue until error recovery either completes the original command, or exhausts all recovery attempts. Therefore, the processing of the loop separates the movement commands from error recovery, while allowing the error recovery modules to use the movement commands in the process of performing error recovery.

Figure 13:
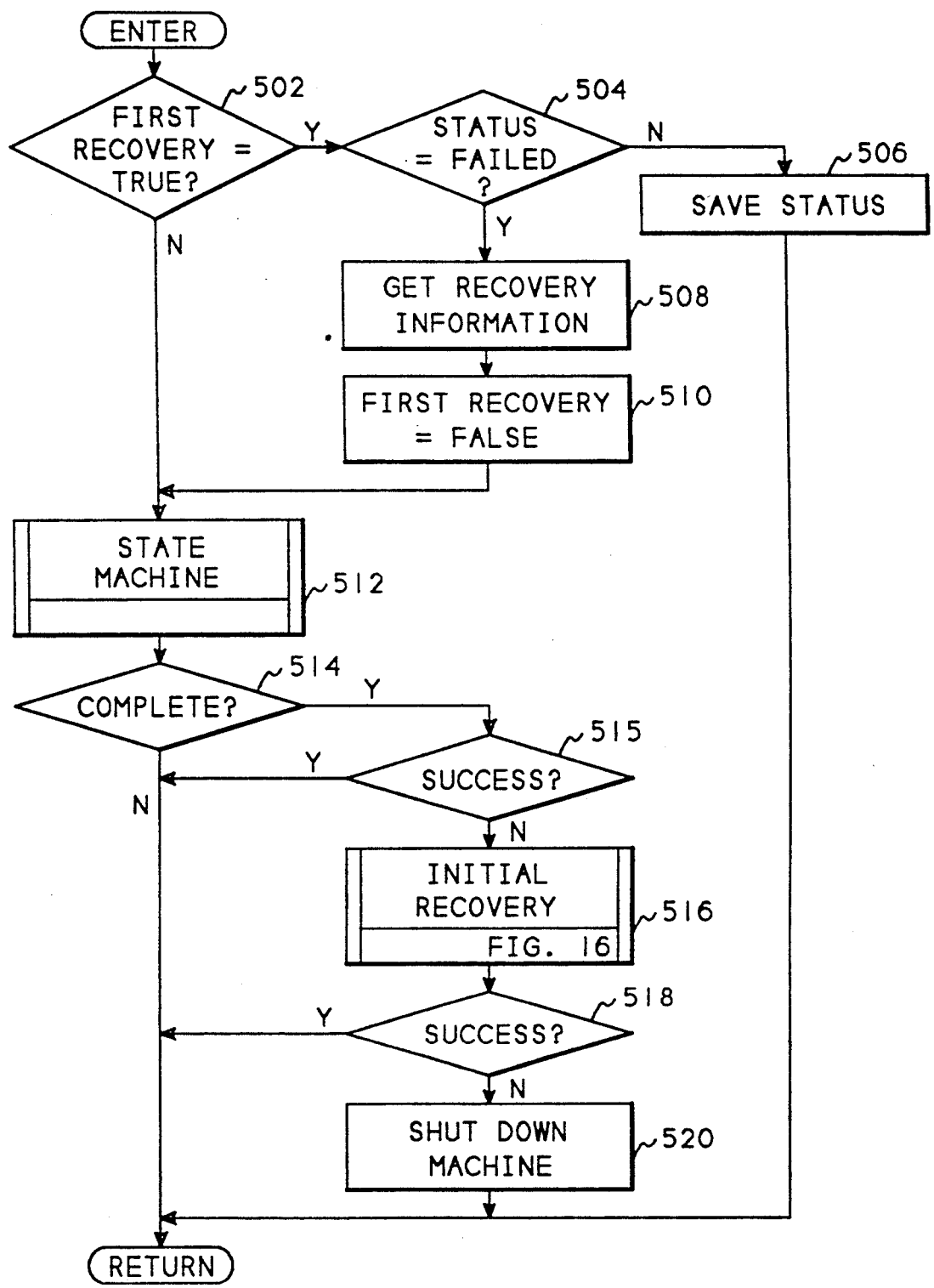
FIG. 13 is a flowchart of the move error recovery function.

FIG. 13 shows a flowchart of the move error recovery function 412 (FIG. 11). Referring now to FIG. 13, after entry, block 502 checks the first recovery flag to determine if it is "true". If this flag is "true", block 502 transfers to block 504 which checks the status to determine if the status is "failed". If the status is not "failed", block 504 transfers to block 506 to save status, since the original command was completed successfully. Block 506 then returns to FIG. 12. If the status is "failed", block 504 transfers to block 508 which saves all the information from in the variables 176 (FIGS. 6 and 9) so that this information can be used by error recovery. Block 510 then sets the first recovery flag to "false", so that error recovery will know that it is in the process of recovering an original error. Block 510 then transfers to block 512 which calls the appropriate error recovery state machine, move recovery 414, seek recovery 416, test recovery 418, or rotate recovery 420 as shown in FIG. 11. The state machine called by block 512 is dependent on the original command being processed. After return from the state machine, block 514 determines whether error recovery is complete. If error recovery is not complete, the state machine has set up a command for execution by the command function coordination modules, so block 514 returns to FIG. 12 to execute this command. As described earlier, the error recovery command will be executed and control will return to FIG. 13, where block 502 will transfer to block 512 to call the state machine that initiated the command. Thus the state machine controls the execution of movement commands, in order to carry out the error recovery operations.

If the state machine indicates that error recovery is complete, block 514 transfers to block 515 which determines whether error recovery was successful. If error recovery was successful, block 515 returns to the caller. If error recovery was not successful, however, block 515 transfers to block 516 which calls the initial recovery module of FIG. 16 in an attempt to place the machine into a known state. Block 518 then determines whether initial recovery was able to place the machine into a known state, and if it was, block 518 returns to the caller. If initial recovery was not successful, block 518 transfers to block 520 which shuts down the autochanger and prevents further operations.

Figure 14:
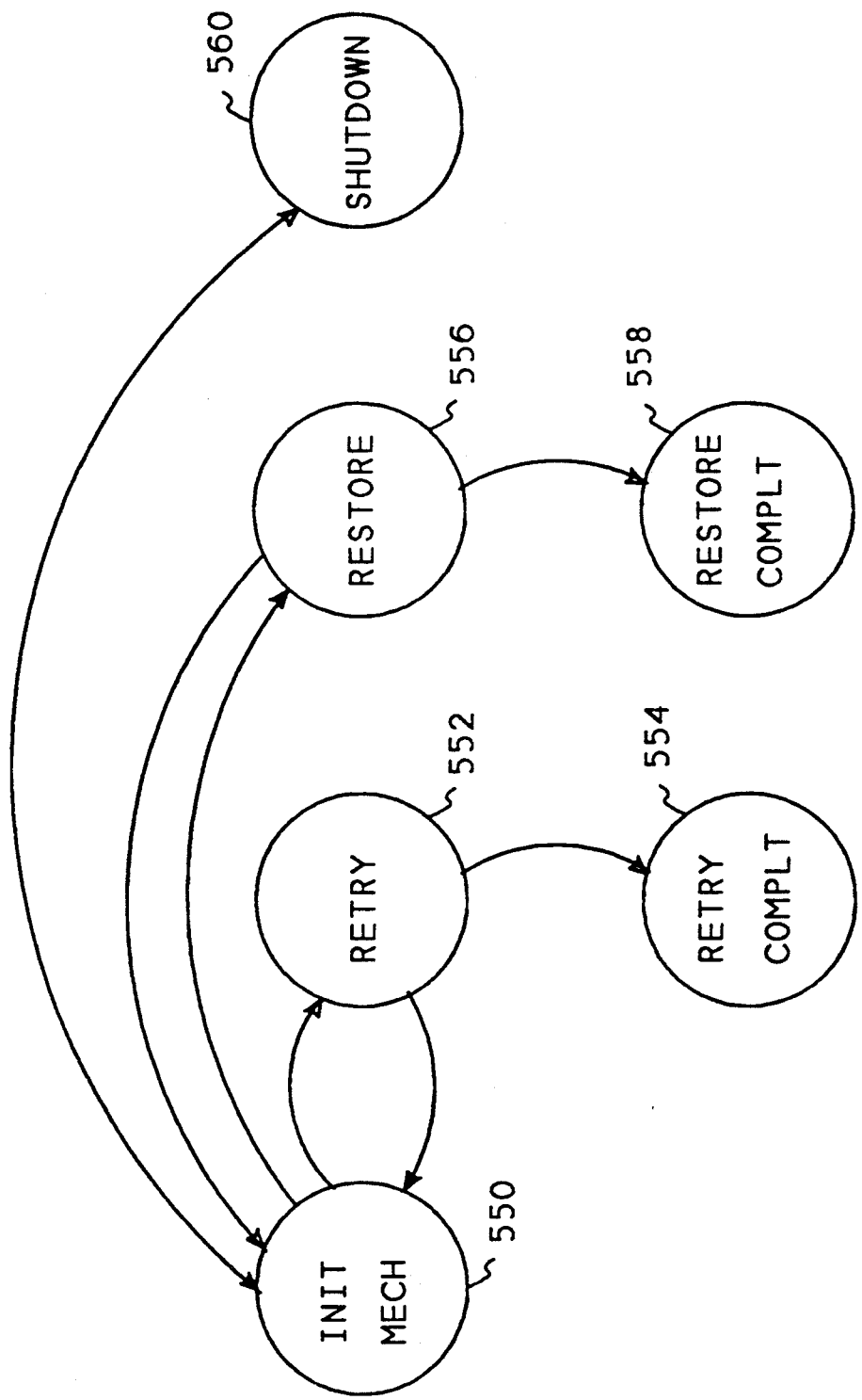
FIG. 14 is a state diagram showing the general states of a function recovery module.
Figure 16:
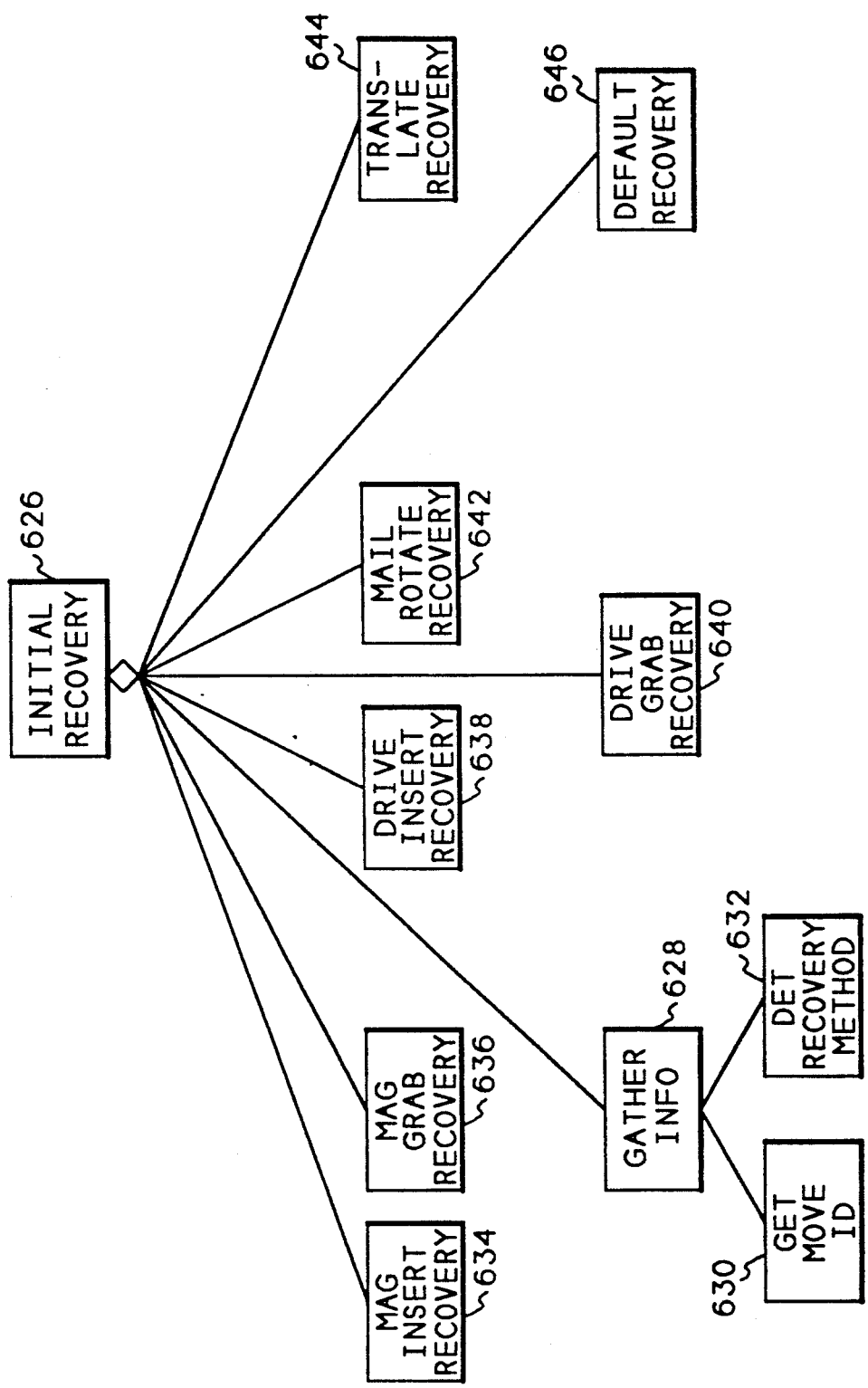
FIG. 16 is a hierarchy diagram of the initial recovery function.

FIG. 14 shows a state diagram of a general model for the recovery state machines. Referring now to FIG. 14, the initial state is the initialize mechanism state 550. In this state, the initial recovery module of FIG. 16 is called to place the mechanism into a known condition. If initial recovery is unsuccessful, the initialize mechanism state 550 will transfer directly to the shut down state 560. If initial recovery was successful, initialize mechanism state 550 will transfer to the retry state 552 to attempt to retry the original command. If retry is successful, it will transfer to retry complete state 554. If retry is unsuccessful, it will return to the initialize mechanism state 550 which will call restore state 556. Restore state 556 attempts to place the autochanger into the state it was in before the original command was attempted. If restore is successful, it will transfer to restore complete state 558. If restore is unsuccessful, it will return to the initialize mechanism state 550 which will go to shut down state 560.

Figure 15:
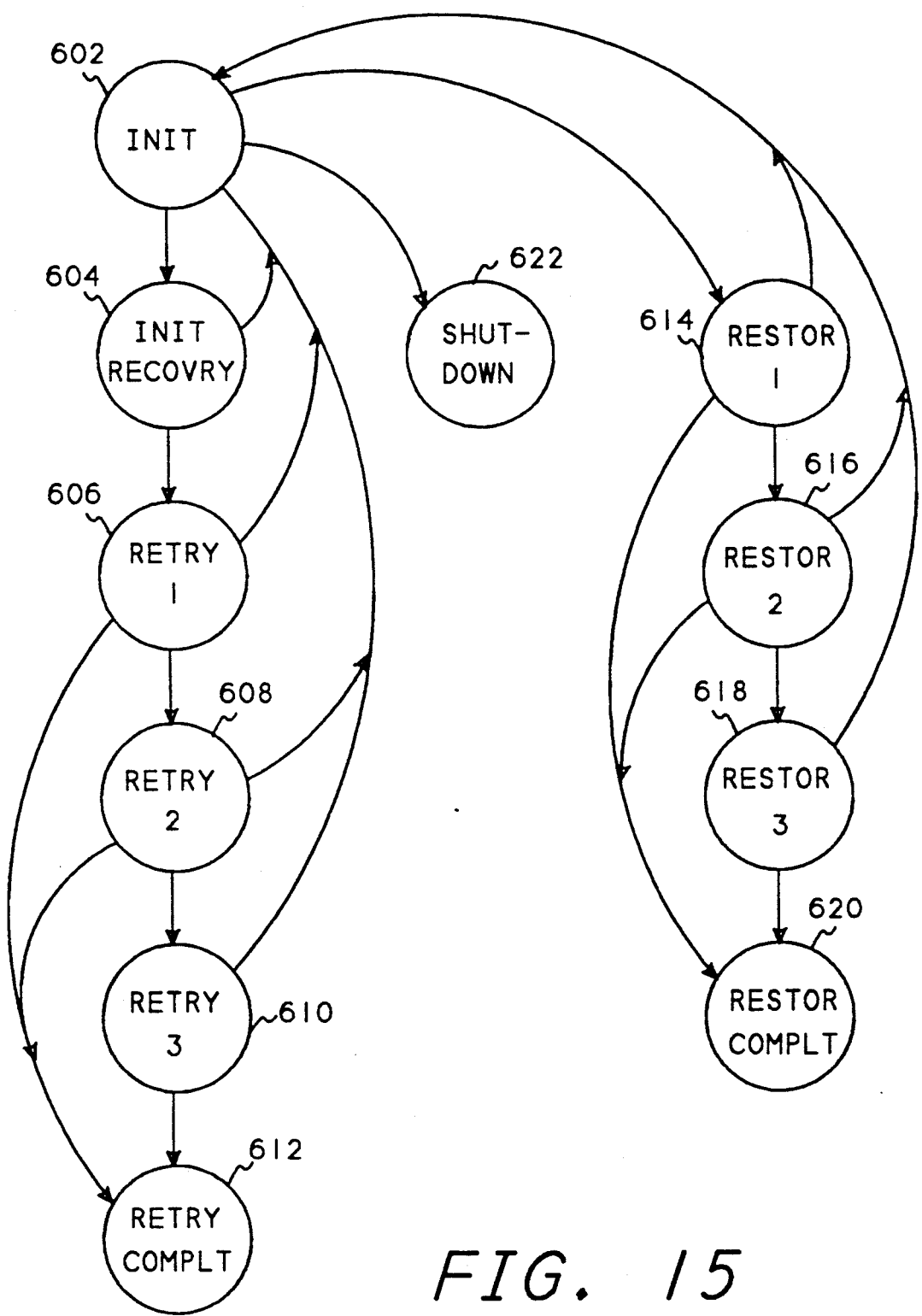
FIG. 15 is a state diagram of the move function recovery module.

FIG. 15 is state diagram of the move recovery module 414 (FIG. 11), which is based on the general state model of FIG. 14. Referring now to FIG. 15, state 602 initialize, transfers to state 604 to call the initial recovery function of FIG. 16. If initial recovery is not successful, the initial recovery state 604 returns to the initialize state 602. If initial recovery is successful, control transfers to retry 1 state 606 to attempt the first retry. If an unrecoverable error occurs during the first retry, retry 1 state 606 will transfer back to initialize state 602. If retry 1 is unsuccessful, but an unrecoverable error does not occur, retry 1 state 602 will transfer to retry 2 state 608 to attempt a second retry. Retry 2 state 608 will re-attempt the original command, and if a unrecoverable error occurs it will return to the initialize state 602. If retry 2 state 608 is unsuccessful, but an unrecoverable error does not occur, it will transfer to retry 3 state 610 for a third attempt. If any of the retry states, retry 1 606, retry 2 608, or retry 3 610 are successful, they will transfer to retry complete state 612 which will return to the caller indicating successful completion. If retry 3 state 610 is unsuccessful, it will return to the initialize state 602. If none of the retries have been successful, but no unrecoverable errors have occurred, the initialize state 602 will transfer to restore 1 state 614 which attempts to put the autochanger back into the state it was in prior to attempting the original command. If restore 1 detects an unrecoverable error, it will return to the initialize state 602. If restore 1 is successful, it will transfer to the restore complete state 620 which will return to the caller indicating success. If restore 1 state 614 is unsuccessful, but no unrecoverable error occurred, it will transfer to restore 2 state 616 to attempt the restore process again. The restore 2 state 616 functions in an identical manner to restore 1, and will transfer to restore 3 if it is unsuccessful but no unrecoverable errors occur. Restore 3 state 618 will return to the initialize state 602 upon detecting an unrecoverable error, or if it is unsuccessful. If restore 3 state is successful, it will transfer to restore complete state 620 which will return to the caller indicating success. If control returns to the initialize state 602, either because of an unrecoverable error or because of the unsuccessful completion of three restore attempts, the initialize state 602 will transfer to shut down state 624 which shuts down the autochanger operations.

FIG. 16 shows a hierarchy diagram of the initial recovery function within the autochanger. Referring now to FIG. 16, the initial recovery module 626 receives control whenever initial recovery is called from some other function. Block 626 first calls gather recovery information 628 to determine what type of operation was in progress at the time the error occurred. Gather recovery information 628 calls get move ID 630 to determine the actual type of move operation in progress at the time of the error, and then calls determine recovery method 632 to determine which type of recovery should be performed. Gather recovery information then returns to initial recovery 626, which calls one of the function recovery modules based on the move ID and recovery method which was determined by gather recovery information 628. Magazine insert recovery 634 is called if the autochanger was in the process of inserting a cartridge into a cell, and magazine grab recovery 636 is called if the autochanger was in the process of retrieving a cartridge from a cell. Drive insert recovery 638 is called if the autochanger had been in the process of inserting a cartridge into the optical drive 26, and drive grab recovery 640 is called if the autochanger had been in the process of retrieving a cartridge from the optical drive 26. Mail rotate recovery 642 is called if the autochanger was in the process of rotating the mail slot when the error occurred, and translate recovery is called if the autochanger was in the process of translating from one column of cells to another when the error occurred. Default recovery 646 is called if none of the other recovery routines are appropriate for the type of error encountered.

Figure 17:
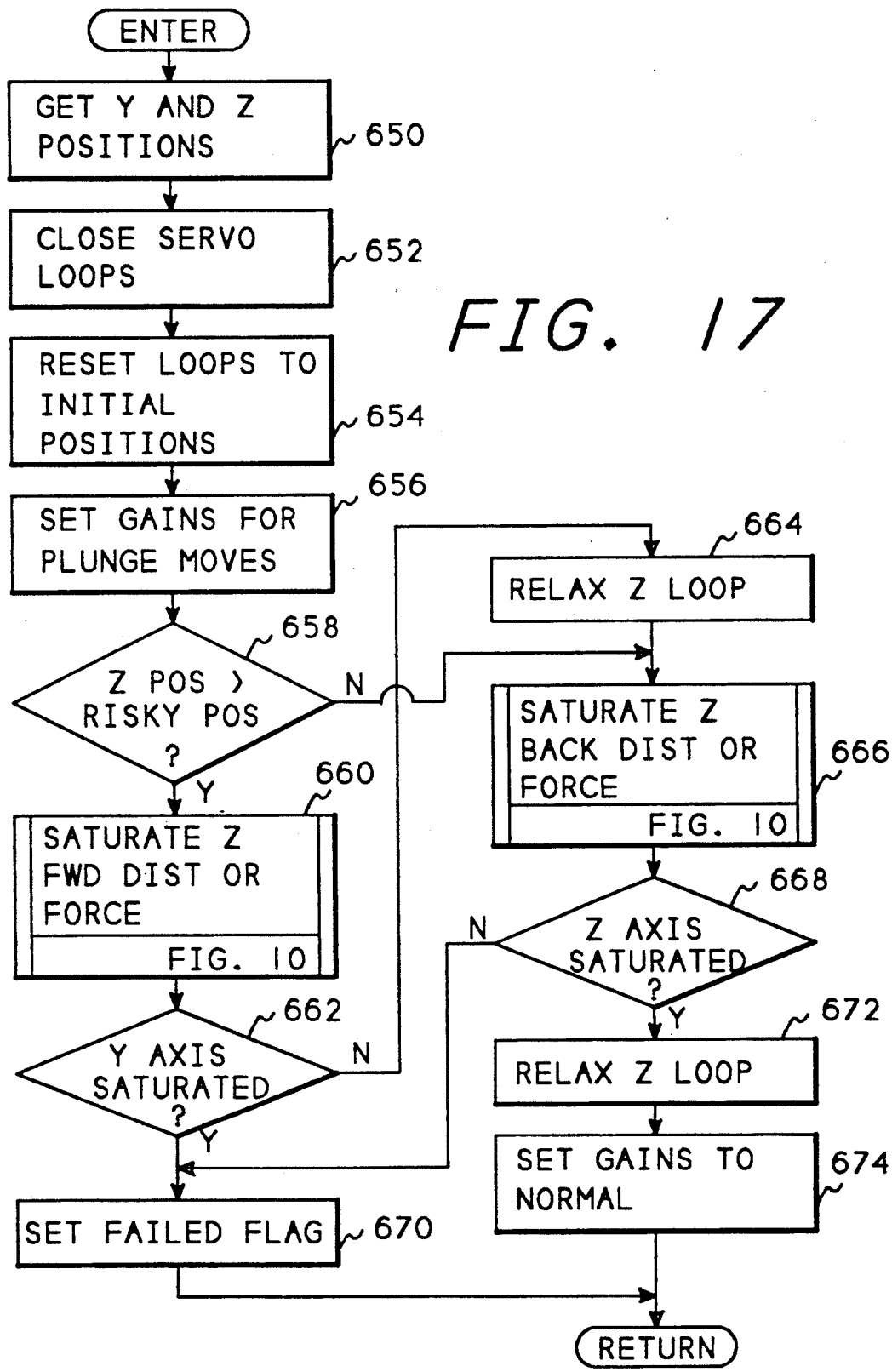
FIG. 17 is a flowchart of the initial recovery function for a cartridge get operation.

FIG. 17 is a flowchart of the magazine grab recovery block 636 of FIG. 16, and illustrates a detailed description of one of the recovery routines. Referring now to FIG. 17, after entry, block 650 gets the current Y and Z positions of the servo control systems. Block 652 then closes the servo loops and block 654 resets the loops to initial positions. Block 656 then sets the control systems gains for a plunge move. Block 658 determines whether the position of the transport is very close to the cells, that is, whether the transport is close enough to a cell to possibly be engaging a cartridge. If the Z position is less than this risky position of 148 milimeters (mm) (that is, too far away to be engaging a cartridge), block 658 transfers directly to block 666. If the Z position is close enough to a cartridge for possible engagement, block 658 transfers to block 660 which calls FIG. 10 to saturate Z forward to an absolute distance of 38 mm or until a force of 12 pounds is encountered to attempt to grab the cartridge. Block 662 then determines whether the Y axis is saturated. Since the transport has just attempted to grab a cartridge, the Y axis should not be in a position where it would be saturated, therefore, if the Y axis is saturated block 662 transfers to block 670 to set the failed flag. If the Y axis is not saturated, block 662 transfers to block 664 which relaxes the Z loop. By relaxing the Z loop, block 664 will relieve any force due to bound up mechanisms that might exist within the transport. Block 664 then transfers to block 666 which calls FIG. 10 to pull the transport back away from the cells to an absolute distance of 210 mm or until a force of 18 pounds is encountered. Block 668 then determines whether the Z axis is saturated, and if the Z axis fails to saturate when it is pulled all the way back, an error has occurred so block 668 transfers to block 670 to set the failed flag. If the Z axis did saturate, block 668 transfers to block 672 to again relax the Z loop and relieve any force due to the transport mechanism being bound up. Block 674 then sets the gains back to normal and returns to the caller.

Whenever one of the function coordination modules 138 (FIG. 4) calls sub-move execution module 140 (FIG. 4), a move ID for the sub-move execution module is stored in non-volatile storage. For example one such move ID, a cartridge get move, was used to cause the initial recovery 626 to call magazine grab recovery 636 as illustrated in FIG. 17. The positions of the various control systems are also stored in non-volatile storage. Because the move ID and positions are stored in non-volatile storage, initial error recovery after a power failure is specific to the move operation that was in process at the time of the power failure. Of course, if no operation was in process at the time of the power failure, no recovery will be attempted when power is restored.

Figure 18:
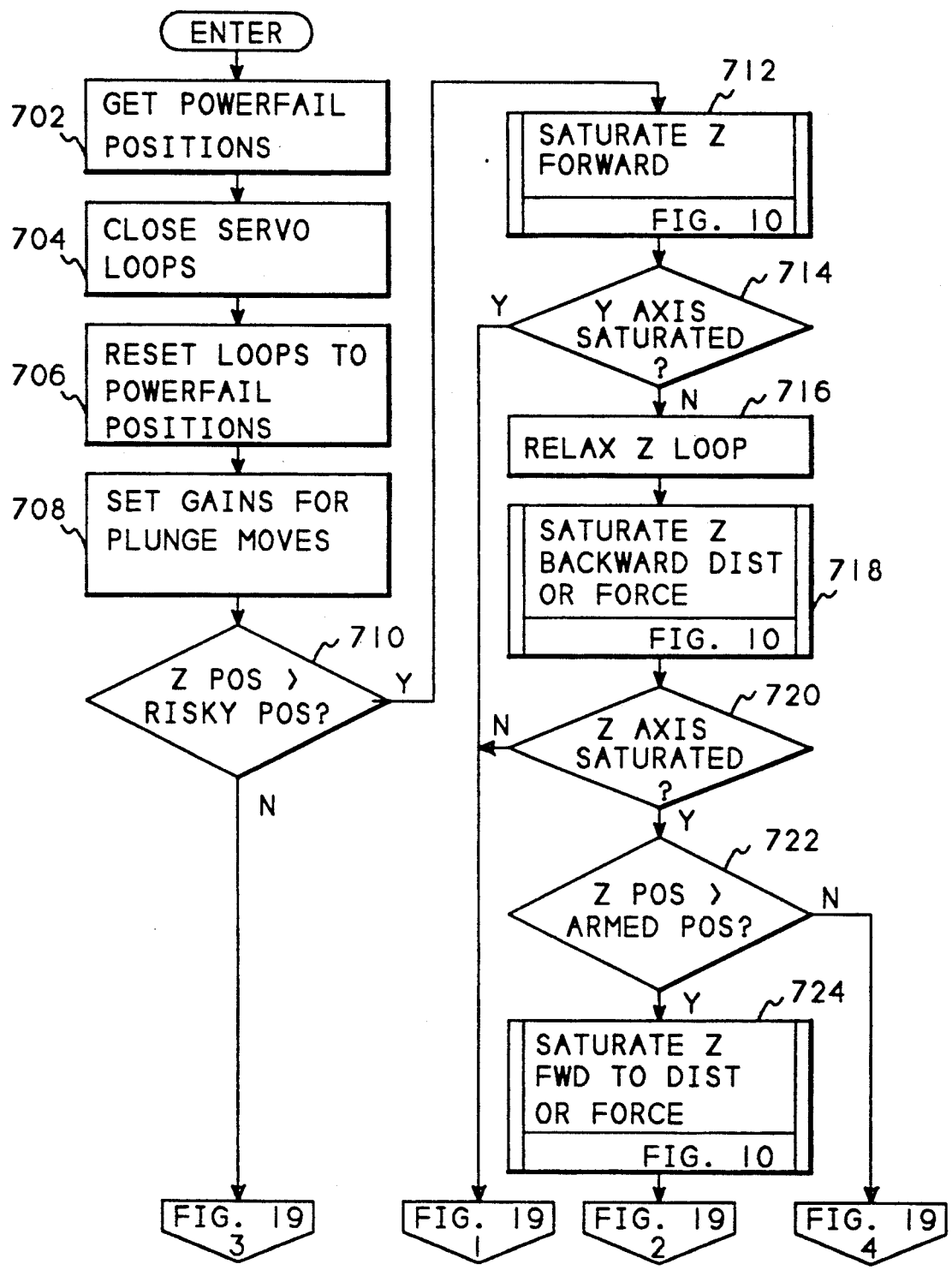
FIGS. 18 and 19 show a flowchart of the initial power fail recovery module.
Figure 19:
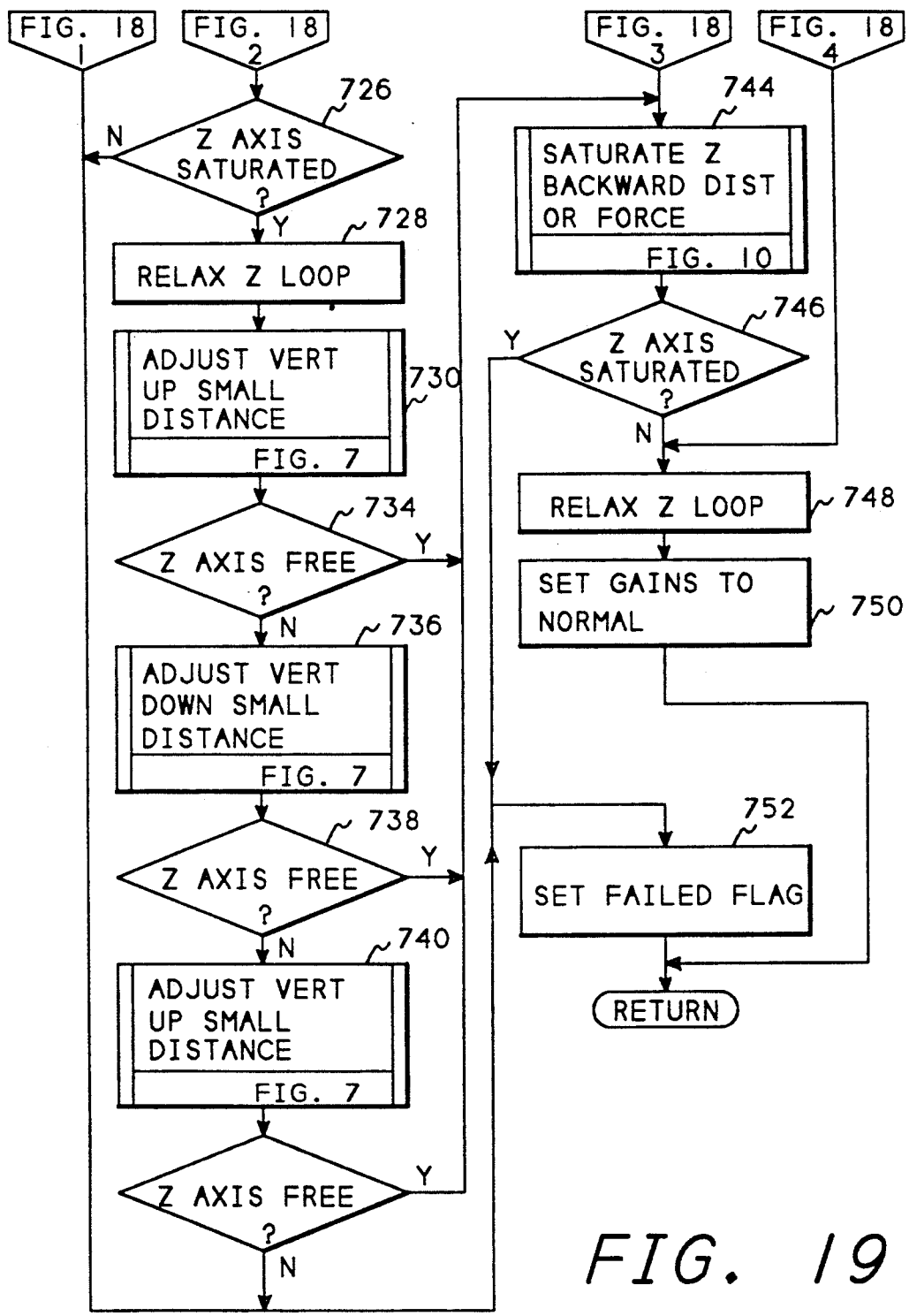

FIGS. 18 and 19 show a flow chart of the power failure initial recovery module that is called when a magazine grab operation was in process at the time of the power failure, and serves to illustrate the type of error recovery that is based on saving the move in process in non-volatile storage during power interruption. Referring now to FIGS. 18 and 19, after entry, block 702 gets the control system positions from non-volatile storage and block 704 closes the servo control loops. Block 706 resets the control loops to the power fail positions as indicated in non-volatile storage, and block 708 sets the control system gains for a plunge operation. Block 710 tests the Z position of the transport to determine whether the transport is close enough to a cell to potentially have a cartridge partially engaged. Because the position of the transport is less certain due to the power interruption, the risky position of 128 mm is further away from the cells than the corresponding position during recovery from a non-power fail error. If the Z position is less than this risky position (that is, further away from the cells), block 710 transfers directly to block 744 of FIG. 19, since there is no risk that a cartridge is partially engaged. If the Z position is greater than the power fail risky position, block 710 transfers to block 712 which calls FIG. 10 to saturate Z outward to an absolute distance of 58 mm or until a force of 12 pounds is encountered to attempt to grab any cartridge that is in the cell. Since the transport is attempting to engage a cartridge, the Y axis should not be in a position where it is saturated. Therefore, block 714 tests the Y axis to determine whether it is saturated and if the Y axis is saturated, block 714 transfers directly to block 752 on FIG. 19 to set the failed flag and return, since no recovery is possible. If the Y axis is not saturated, block 714 transfers to block 716 to relax the Z loop to relieve any force due to bound up mechanisms. Block 718 then calls FIG. 10 to saturate Z backward an absolute distance 210 mm or until 128 pounds of force is encountered to retrieve the cartridge from the cell if possible. Block 720 then determines whether the Z axis is actually saturated. If the Z axis failed to saturate, block 720 transfers to block 752 on FIG. 19 to set the failed flag and return, since recovery is not possible. If the Z axis did saturate, block 720 transfers to block 722 which determines whether the transport Z position is still extended beyond the original position of 88.6 mm. If the Z position is not extended, that is, the transport is completely away from the cells, the Z mechanism is free and block 722 transfers to block 748 on FIG. 19. If the transport Z position is still close to the cells, that is, in the position where the fingers are armed, block 722 transfers to block 724 which calls FIG. 10 to saturate the Z outward toward the cells to a distance of 20 mm or until 12 pounds of force is encountered. Block 726 then determines whether the Z axis is saturated. If the Z axis fails to saturate, block 726 transfers to block 752 to set the failed flag since the Z system did not detect a force. If the Z axis is saturated, block 726 transfers to block 728 to relax the Z loop. At this point it is assumed that the transport may be bound against the edge of an obstruction, so the transport will be moved up and down slightly to try to center the transport to a cell. Therefore, block 730 calls FIG. 7 to move the transport upwards slightly, a distance of 4 mm. Block 734 then checks to see whether the Z axis is free, and if it is free block 734 transfers directly to block 744. If the Z axis is not yet free, block 734 transfers to block 736 which calls FIG. 7 to move the transport down a slight distance 8 mm. Block 738 again checks to see if the Z axis is free, and if it is block 738 transfers to block 744. If the Z axis is not yet free, block 738 transfers to block 740 which again attempts to move the transport up a small distance of 4 mm. Block 742 checks to determine if the Z axis is free and if it is not free at this point it is assumed that it cannot be freed and block 742 transfers to block 752 to set the failed flag. If the Z axis is free at this point, block 742 transfers to block 744 which calls FIG. 10 to move the transport back away from the cells a distance of 210 mm or until 18 pounds of force is encountered. Block 746 then determines whether the Z axis has saturated and if the Z axis has still failed to saturate, block 746 transfers to block 752 to set the failed flag and return. If the Z axis has finally saturated, block 746 transfers to block 748 to again relax the Z loop to relieve any force due to bound up mechanisms. Block 750 then sets the control systems gains to normal and returns.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. In a cartridge handling system, a process for performing a plurality of commands for moving a transport of said handling system from a first location to a second location, and correcting movement errors encountered during such moving, said process comprising the steps of:
    (a) starting a foreground process to perform high level moving functions, wherein said high level moving functions comprise the steps of
        receiving a movement command,
        creating movement parameters for a servo move profile defining movement of said transport in performing said movement command, and
        initiating transport movement;
    (b) starting a background process to perform low level moving functions, wherein said low level moving functions comprise the steps of
        building a servo move profile using said movement parameters,
        sending electrical signals to motors connected to said transport to cause said motors to move said transport along said servo move profile, and
        monitoring said electrical signals and determining if said transport movement follows said servo move profile;
    (c) if an error condition is encountered by said background process, stopping said background process and setting the value of a state update flag whereby further updates of a machine state are prevented;
    (d) completing said foreground process; and
    (e) if said state update flag indicates an error, performing error recovery using said machine state.

2. The process of claim 1 wherein step (b) further comprises the step of storing a movement identification indicator in said machine state (176) for each part of said command.

3. The process of claim 2 wherein step (e) further comprises the step of performing a different initial mechanism error recovery function for each movement identification indicator.

4. The process of claim 3 wherein step (e) further comprises the step of using measured force to select one of a pre-determined sequence of sub-movements.

5. The process of claim 2 wherein step (b) further comprises the step of storing said command and said movement identification indicator in non-volatile storage.

6. The process of claim 1 wherein step (e) further comprises the step of performing a different error recovery function for each command.

7. The process of claim 6 wherein step (e) further comprises the steps of:
    (e1) placing said transport into a known state;
    (e2) retrying said part of said movement identified by said command;
    (e3) if step (e2) is unsuccessful, restoring said transport to a state prior to starting said command; and
    (e4) if step (e3) is unsuccessful, disabling further movement of said transport.

8. The process of claim 6 wherein step (e) further comprises the step of re-executing steps (a) through (d) for each command created during error recovery.

9. In a cartridge handling system, a process for performing a plurality of commands for moving a transport of said handling system from a first location to a second location, and correcting movement errors encountered if an electrical power failure occurs during such moving, said process comprising the steps of:
    (a) recording a command indicator in non-volatile storage before starting each command;
    (b) removing said command indicator from said non-volatile storage after said movement is complete; and
    (c) if a command indicator is present in said non-volatile storage when electrical power is re-applied to said cartridge handling system, using said command indicator to perform error correction operations.

10. The process of claim 9 wherein step (a) further comprises the step of recording each movement identification of each of said commands and step (c) further comprises using sub-movement identification.

11. The process of claim 9 wherein step (c) further comprises the step of using measured force to select one of a pre-determined sequence of sub-movements.

* * * * *